US011023571B2

(12) United States Patent
Lee et al.

(10) Patent No.: US 11,023,571 B2
(45) Date of Patent: Jun. 1, 2021

(54) METHOD FOR REGISTERING AND AUTHENTICATING BIOMETRIC DATA AND ELECTRONIC DEVICE THEREOF

(71) Applicant: Samsung Electronics Co., Ltd., Gyeonggi-do (KR)

(72) Inventors: Haechang Lee, Gyeonggi-do (KR); Jaehyung Park, Gyeonggi-do (KR); Jiwoong Oh, Seoul (KR); Pil-Joo Yoon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 23 days.

(21) Appl. No.: 16/469,002

(22) PCT Filed: Nov. 20, 2017

(86) PCT No.: PCT/KR2017/013203
§ 371 (c)(1),
(2) Date: Jun. 12, 2019

(87) PCT Pub. No.: WO2018/110847
PCT Pub. Date: Jun. 21, 2018

(65) Prior Publication Data
US 2019/0318073 A1    Oct. 17, 2019

(30) Foreign Application Priority Data
Dec. 12, 2016    (KR) .................. 10-2016-0168640

(51) Int. Cl.
*G06F 21/32*    (2013.01)
*G06F 21/45*    (2013.01)
(Continued)

(52) U.S. Cl.
CPC .............. *G06F 21/32* (2013.01); *G06F 3/041* (2013.01); *G06F 21/45* (2013.01); *G06K 9/001* (2013.01)

(58) Field of Classification Search
CPC .......... G06F 21/32; G06F 3/041; G06F 21/45; G06K 9/001
See application file for complete search history.

(56) References Cited

U.S. PATENT DOCUMENTS

2010/0240415 A1    9/2010  Kim et al.
2013/0004032 A1*   1/2013  Abiko ................ G06K 9/00087
                                                        382/124
(Continued)

FOREIGN PATENT DOCUMENTS

KR         101657549       9/2011
KR        1020150007082    1/2015
(Continued)

OTHER PUBLICATIONS

PCT/ISA/210 Search Report issued on PCT/KR2017/013203 (pp. 9).
PCT/ISA/237 Written Opinion issued on PCT/KR2017/013203 (pp. 5).

*Primary Examiner* — Lixi C Simpson
(74) *Attorney, Agent, or Firm* — The Farrell Law Firm, P.C.

(57) ABSTRACT

The present invention is for registering and authenticating biometric data in an electronic device, the electronic device including: a display including a touch sensor; a fingerprint sensor for acquiring fingerprint data through at least a partial region of the display region of the display; and a processor. Here, the processor can be set to: acquire first touch information from a first user input using the touch sensor, in response to the first user input for registering a fingerprint of a user; acquire first fingerprint data using the fingerprint sensor; register the first fingerprint data as fingerprint information based on the first touch information, the registering operation including an operation for classifying the first fingerprint data based on the first touch information; acquire (Continued)

second touch information from a second user input using the touch sensor, in response to the second user input for authenticating the fingerprint of the user; acquire second fingerprint data using the fingerprint sensor; select a candidate group for comparison from among the fingerprint information based on the second touch information; and compare fingerprint data included in the candidate group with the second fingerprint data.

12 Claims, 25 Drawing Sheets

(51) Int. Cl.
*G06F 3/041* (2006.01)
*G06K 9/00* (2006.01)

(56) References Cited

U.S. PATENT DOCUMENTS

| | | | |
|---|---|---|---|
| 2015/0016695 A1 | 1/2015 | Yoon | |
| 2015/0086090 A1 | 3/2015 | Jung et al. | |
| 2015/0116086 A1* | 4/2015 | Kim | G06F 21/32 340/5.83 |
| 2015/0254446 A1* | 9/2015 | LaCous | G06K 9/00087 726/19 |
| 2015/0324570 A1 | 11/2015 | Lee et al. | |
| 2016/0180146 A1 | 6/2016 | Setterberg et al. | |
| 2017/0193261 A1* | 7/2017 | Schwartz | G06K 9/001 |
| 2018/0074637 A1* | 3/2018 | Rosenberg | G06F 3/0418 |
| 2018/0121708 A1* | 5/2018 | Zhang | H04L 9/3231 |

FOREIGN PATENT DOCUMENTS

| | | |
|---|---|---|
| KR | 1020150034832 | 4/2015 |
| KR | 1020150128377 | 11/2015 |
| KR | 1020160101249 | 8/2016 |

* cited by examiner

METHOD FOR REGISTERING AND AUTHENTICATING BIOMETRIC DATA AND ELECTRONIC DEVICE THEREOF

PRIORITY

This application is a National Phase Entry of PCT International Application No. PCT/KR2017/013203, which was filed on Nov. 20, 2017, and claims priority to Korean Patent Application No. 10-2016-0168640, which was filed on Dec. 12, 2016, the content of each of which are incorporated herein by reference.

TECHNICAL FIELD

Various embodiments of the disclosure relate to a method for registering and authenticating biometric data and an electronic device thereof.

BACKGROUND ART

With the gradually increasing performance of portable electronic devices such as smart phones, various services are provided through the electronic devices. Specifically, service areas have expanded to cover more complicated services, such as games, messengers, text editing, and image/video playback and editing, besides basic services such as telephone communication and text transmission. Providing various services through the electronic devices requires various functions including simple input/output and processing of data. In particular, a service requiring security, such as a mobile payment service, may be provided and biometric data (for example, fingerprint, iris, etc.) are also utilized in order to ensure reliable security.

For example, fingerprint data may be acquired through a fingerprint sensor. Generally, a fingerprint sensor embedded in an electronic device has smaller in size than a finger. Therefore, the registration of integral fingerprint information of a user in the electronic device causes inconvenience in that a fingerprint of a user must be repeatedly acquired. At the time of user authentication using a fingerprint, the similarity of the fingerprint to registered fingerprints is checked. The more registered fingerprints there are, the more time and power consumption are required for authentication.

DISCLOSURE OF INVENTION

Technical Problem

Various embodiments of the disclosure provide a method for effectively authenticating biometric data and an electronic device thereof.

Various embodiments of the disclosure provide a method for storing fingerprint data in view of a convenience in the authentication and an electronic device thereof.

Various embodiments of the disclosure provide a method for reducing candidate data for checking in the authentication of biometric information and an electronic device thereof.

Various embodiments of the disclosure provide a method for storing touch information together at the time of the registration of fingerprint information and an electronic device thereof.

Various embodiments of the disclosure provide a method for classifying fingerprint data based on touch information and an electronic device thereof.

Various embodiments of the disclosure provide a method for determining a candidate group of fingerprint data for fingerprint authentication based on touch information and an electronic device thereof.

Solution to Problem

According to various embodiments of the disclosure, an electronic device includes: a display including a touch sensor; a fingerprint sensor configured to acquire fingerprint data through at least a partial region of a display region of the display; and a processor. The processor may be configured to: acquire, in response to a first user input for registering a user's fingerprint, first touch information from the first user input by using the touch sensor; acquire first fingerprint data by using the fingerprint sensor; register the first fingerprint data as fingerprint information based on the first touch information, the registering including classifying the first fingerprint data based on the first touch information; acquire, in response to a second user input for authenticating the user's fingerprint, second touch information from the second user input by using the touch sensor; acquire second fingerprint data by using the fingerprint sensor; select a candidate group for comparison from among the fingerprint information based on the second touch information; and compare fingerprint data included in the candidate group with the second fingerprint data.

According to various embodiments of the disclosure, an electronic device may include: a display including a touch sensor; a fingerprint sensor configured to acquire fingerprint data through at least a partial region of a display region of the display; and a processor. The processor is configured to: store information on a touch input occurring for registering a fingerprint; and determine, using the information on the touch input, a candidate group for checking of matching of a fingerprint for fingerprint authentication.

According to various embodiments of the disclosure, an electronic device may include: display including a touch sensor in a display region for displaying a content; a fingerprint sensor disposed in at least a partial region of the display region; and a processor. The processor may be configured to: acquire one or more user inputs through the at least partial region of the display region, the acquiring including acquiring one or more fingerprint data corresponding to the one or more user inputs and one or more touch information corresponding to the user inputs by using the fingerprint sensor; and register the one or more touch information and the one or more fingerprint data as one or more pieces of fingerprint information corresponding to the user.

According to various embodiments of the disclosure, an operation method of an electronic device includes: storing information on a touch input occurring for registering a fingerprint, through a display including a touch sensor and a fingerprint sensor configured to acquire fingerprint data through at least a partial region of a display region; and determining, using the information on the touch input, a candidate group for checking of matching of a fingerprint for fingerprint authentication.

According to various embodiments of the disclosure, when multiple instructions included in a non-transitory computer readable medium are executed by a processor, the processor is configured to perform: storing information on a touch input occurring for registering a fingerprint in a display in which a fingerprint sensor is installed to acquire fingerprint data through at least a partial region of a display region; and determining, using the information on the touch input, a candidate group for checking of matching of a fingerprint for fingerprint authentication.

Advantageous Effects of Invention

A method and an electronic device according to various embodiments can store fingerprint data and touch information together at the time of fingerprint registration, thereby limiting a candidate group of fingerprint data to be checked for authentication. Therefore, the speed of a matching algorithm can be enhanced at the time of fingerprint recognition.

BEST MODE FOR CARRYING OUT THE INVENTION

Figure 1:
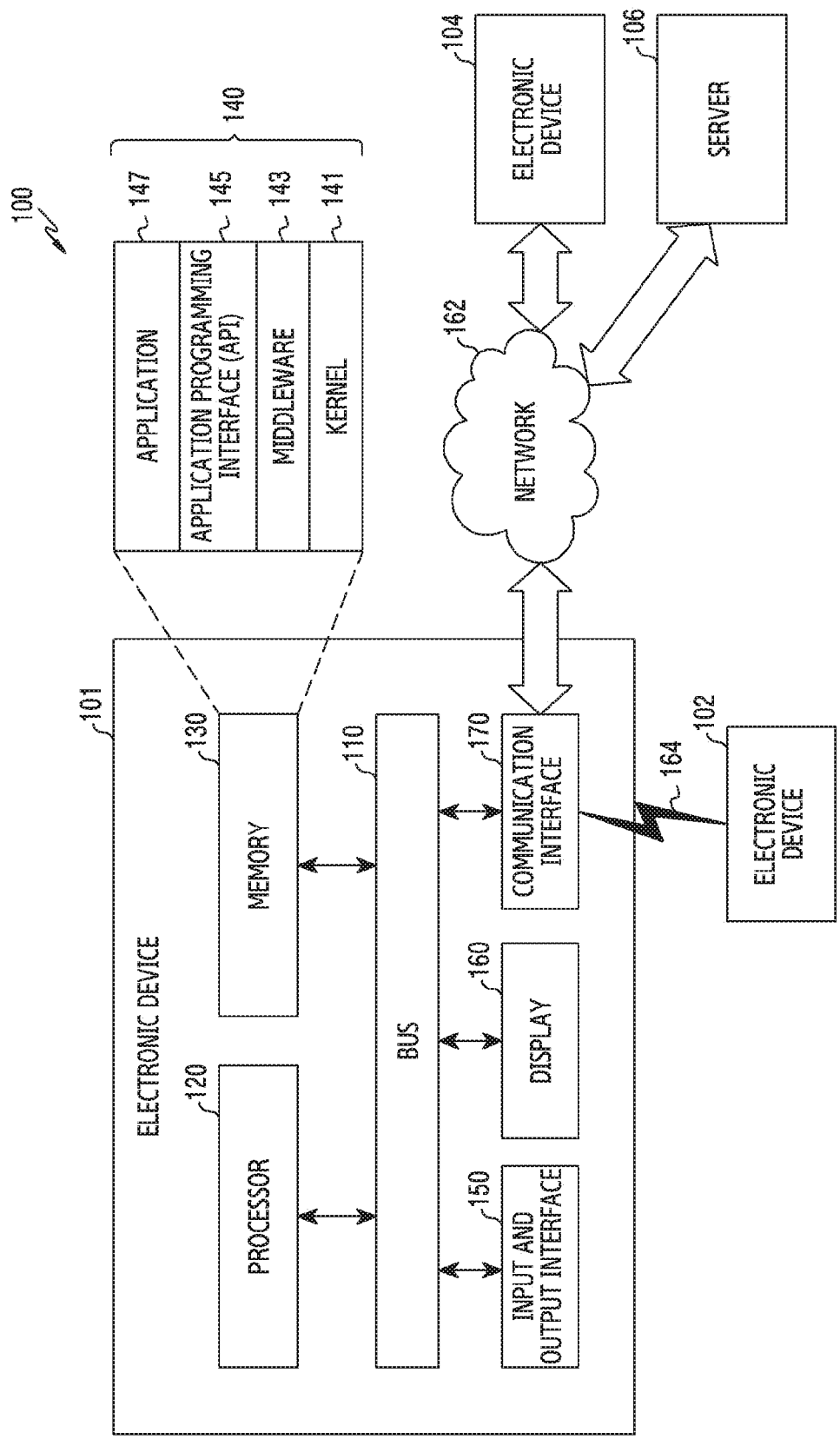
FIG. 1 illustrates an electronic device within a network environment according to various embodiments of the disclosure.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context. In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of ~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.). According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices. In the present document, the term 'user' may denote a person who uses the electronic device or a device (e.g., an artificial-intelligent electronic device) which uses the electronic device.

FIG. 1 illustrates a network environment 100 including an electronic device, according to various embodiments of the present disclosure. Referring to FIG. 1, the electronic device 101 may include a bus 110, a processor 120, a memory 130, an input/output interface 150, a display 160, and a communication interface 170. According to various embodiments of the present disclosure, at least one of the above elements of the electronic device 101 may be omitted from the electronic device 101, or the electronic device 101 may additionally include other elements. The bus 110 may include a circuit that interconnects the elements 120 to 170 and delivers a communication (e.g., a control message or data) between the elements 120 to 170. The processor 120 may include one or more of a CPU, an AP, and a communication processor (CP). The processor 120 may perform calculations or data processing related to control over and/or communication by at least one of the other elements of the electronic device 101.

The memory 130 may include a volatile memory and/or a non-volatile memory. The memory 130 may store commands or data related to at least one of the other elements of the electronic device 101. According to an embodiment of the present disclosure, the memory 130 may store software and/or a program 140. The program 140 may include a kernel 141, middleware 143, an application programming interface (API) 145, and/or an application 147. At least some of the kernel 141, the middleware 143, and the API 145 may be referred to as an operating system (OS). The kernel 141 may control or manage system resources (e.g., the bus 110, the processor 120, the memory 130, etc.) used to execute operations or functions implemented by the other programs (e.g., the middleware 143, the API 145, and the application 147). Also, the kernel 141 may provide an interface capable of controlling or managing the system resources by accessing the individual elements of the electronic device 101 by using the middleware 143, the API 145, or the application 147.

The middleware 143 may serve as an intermediary that enables the API 145 or the application 147 to communicate with the kernel 141 and to exchange data therewith. Also, the middleware 143 may process one or more task requests received from the application 147 according to a priority. The middleware 143 may assign a priority, which enables the use of system resources (e.g., the bus 110, the processor 120, the memory 130, etc.) of the electronic device 101, to at least one of the applications 147, and may process the one or more task requests according to the assigned priority. The API 145 is an interface through which the application 147 controls a function provided by the kernel 141 or the middleware 143, and may include at least one interface or function (e.g., instruction) for file control, window control, image processing, character control, etc. The input/output interface 150 may deliver a command or data, which is input from a user or an external device, to the element(s) other than the input/output interface 150 within the electronic device 101, or may output, to the user or an external device, commands, or data received from the element(s) other than the input/output interface 150 within the electronic device 101.

The display 160 may include a liquid crystal display (LCD), a light-emitting diode (LED) display, an organic light-emitting diode (OLED) display, a micro electro mechanical systems (MEMS) display, and an electronic paper display. The display 160 may display various pieces of content (e.g., text, images, videos, icons, symbols, etc.) to the user. The display 160 may include a touch screen, and may receive a touch input, a gesture input, a proximity input, or a hovering input provided by an electronic pen or a body part of the user. The communication interface 170 may establish communication between the electronic device 101 and an external device (e.g., a first external electronic device 102, a second external electronic device 104, or a server 106). The communication interface 170 may be connected to a network 162 through wireless or wired communication, and may communicate with the external device.

The types of wireless communication may include, for example, cellular communication which uses long-term evolution (LTE), LTE-advanced (LTE-A), code division multiple access (CDMA), wideband CDMA (WCDMA), universal mobile telecommunications system (UMTS), WiBro (Wireless Broadband), and global system for mobile communications (GSM). According to an embodiment of the present disclosure, the types of wireless communication 164 may include wireless fidelity (Wi-Fi), light fidelity (Li-Fi), Bluetooth™, Bluetooth low energy (BLE), ZigBee, near field communication (NFC), magnetic secure transmission (MST), radio frequency (RF), and body area network (BAN). The types of wireless communication may include a GNSS. The GNSS may be a global positioning system (GPS), a global navigation satellite system (GLONASS), a Beidou navigation satellite system (Beidou), or the European global satellite-based navigation system (Galileo). Hereinafter, in the present disclosure, the term "GPS" may be used interchangeably with the term "GNSS." The types of wired communication may include a universal serial bus (USB), a high definition multimedia interface (HDMI), recommended standard 232 (RS-232), power line communication (PLC), and a plain old telephone service (POTS). The network 162 may include telecommunication networks, such as a computer network (e.g., a local area network (LAN) or a wide area network (WAN)), the Internet, and a telephone network.

Each of the first and second external electronic devices 102 and 104 may be of a type identical to or different from that of the electronic device 101. According to various embodiments of the present disclosure, all or some of operations performed by the electronic device 101 may be performed by another electronic device or multiple electronic devices (e.g., the first and second external electronic devices 102 and 104, or the server 106). When the electronic device 101 needs to perform some functions or services automatically or by a request, the electronic device 101 may send, to another device, a request for performing at least some functions related to the functions or services, instead of performing the functions or services by itself, or additionally. Another electronic device may execute the requested functions or the additional functions, and may deliver a result of the execution to the electronic device 101. The electronic device 101 may process the received result without any change or additionally, and may provide the requested functions or services. To this end, cloud computing technology, distributed computing technology, or client-server computing technology.

Figure 2:
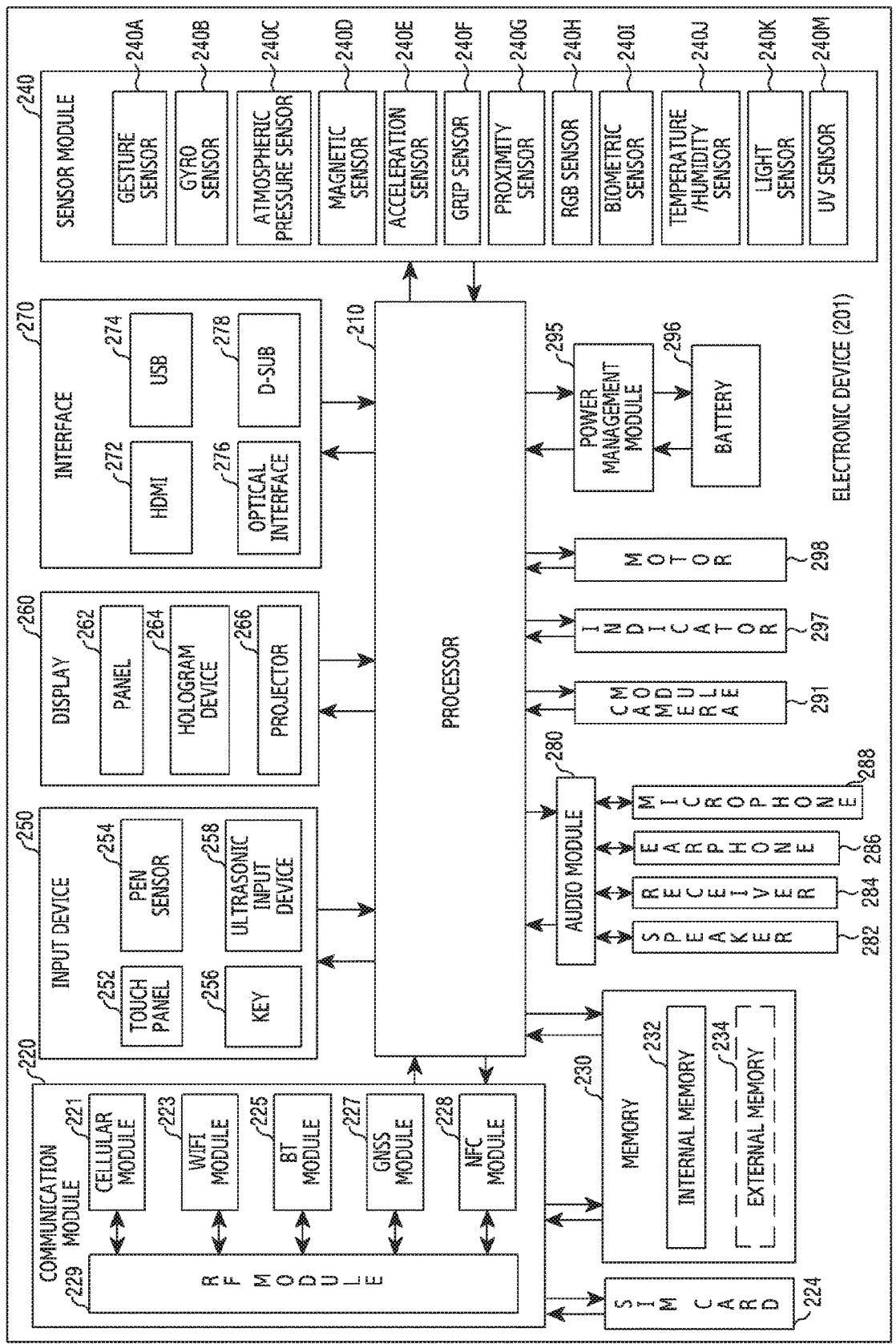
FIG. 2 is a block diagram of an electronic device according to various embodiments of the disclosure.

FIG. 2 is a block diagram illustrating a configuration of an electronic device, according to various embodiments of the present disclosure. According to various embodiments of the present disclosure, electronic device 201 may include all or a part of the electronic device 101. Referring to FIG. 2, the electronic device 201 may include one or more processors 210 (e.g., an AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software components connected to the processor 210 by driving an OS or an application program, and perform processing of various pieces of data and calculations. The processor 210 may be implemented as, for example, a system on chip (SoC). According to an embodiment of the present disclosure, the processor 210 may further include a graphic processing unit (GPU) and/or an image signal processor (ISP). The processor 210 may include a part (e.g., a cellular module 221) of the components of electronic device 201. The processor 210 may load, into a volatile memory, commands or data received from at least one (e.g., a non-volatile memory) of the other components and may process the loaded commands or data, and may store a variety of data in a non-volatile memory.

According to various embodiments of the present disclosure, the communication module 220 may, have a configuration equivalent or similar to that of the communication interface 170. The communication module 220 may include a cellular module 221, a Wi-Fi module 223, a Bluetooth (BT) module 225, a GNSS module 227 (e.g., a GPS module, a Glonass module, a Beidou module, or a Galileo module), an NFC module 228, and a RF module 229. The cellular module 221 may provide a voice call, a video call, a text message service, or an Internet service through a communication network. According to various embodiments of the present disclosure, the cellular module 221 may distinguish and authenticate the electronic device 201 in a communication network using the SIM 224 (e.g., the SIM card). The cellular module 221 may perform at least some of the functions that the processor 210 may provide. The cellular module 221 may include a CP. According to various embodiments of the present disclosure, each of the Wi-Fi module 223, the BT module 225, the GNSS module 227, and the NFC module 228 may include a processor for processing data transmitted/received through a corresponding module. At least some (e.g., two or more) of the cellular module 221, the Wi-Fi module 223, the BT module 225, the GNSS module 227, and the NFC module 228 may be included in one integrated circuit (IC) chip or IC package. The RF module 229 may transmit or receive a communication signal (e.g., an RF signal). The RF module 229 may include a transceiver, a power amplifier module (PAM), a frequency filter, a low noise amplifier (LNA), and an antenna. According to various embodiments of the present disclosure, one of the cellular module 221, the WI-FI module 223, the BT module 225, the GNSS module 227, and the NFC module 228 may transmit/receive an RF signal through a separate RF module. According to various embodiments of the present disclosure, SIM 224 may include a card including a SIM and/or an embedded SIM, and may contain unique identification information (e.g., an integrated circuit card identifier (ICCID)) or subscriber information (e.g., an international mobile subscriber identity (IMSI)).

The memory 230 may include an embedded memory 232 or an external memory 234. The embedded memory 232 may include a volatile memory (e.g., a dynamic random access memory (DRAM), a static RAM (SRAM), a synchronous dynamic RAM (SDRAM), etc.) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), etc.). The external memory 234 may further include a flash drive such as a compact flash (CF), a secure digital (SD), a micro secure digital (Micro-SD), a mini secure digital (mini-SD), an eXtreme Digital (xD), a multi-media card (MMC), a memory stick, etc. The external memory 234 may be functionally and/or physically connected to the electronic device 201 through various interfaces.

According to various embodiments of the present disclosure, sensor module 240 may measure a physical quantity or detect an operation state of the electronic device 201, and may convert the measured or detected information into an electrical signal. The sensor module 240 may include a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor 240I (e.g., medical sensor), a temperature/humidity sensor 240J, an illuminance sensor 240K, and a ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuit for controlling one or more sensors included therein. The electronic device 201 may further include a processor configured to control the sensor module 240, as a part of the processor 210 or separately from the processor 210, and may control the sensor module 240 while the processor 210 is in a sleep state.

The input device 250 may include a touch panel 252, a (digital) pen sensor 254, a key 256, or an ultrasonic input device 258. The touch panel 252 may use one of a capacitive type, a resistive type, an infrared type, and an ultrasonic type. The touch panel 252 may further include a control circuit. The touch panel 252 may further include a tactile layer, and provide a tactile reaction to the user. The (digital) pen sensor 254 may include a recognition sheet which is a part of the touch panel or is separated from the touch panel. The key 256 may include a physical button, an optical key, or a keypad. The ultrasonic input device 258 may detect, through a microphone 288, ultrasonic waves generated by an input tool, and identify data corresponding to the detected ultrasonic waves.

The display 260 may include a panel 262, a hologram device 264, or a projector 266. The panel 262 may include a configuration identical or similar to the display 160. The panel 262 may be implemented to be flexible, transparent, or wearable. The panel 262 may be integrated as a single module with the touch panel 252. The hologram device 264 may show a three dimensional (3D) image in the air by using an interference of light. The projector 266 may project light onto a screen to display an image. The screen may be located in the interior of or on the exterior of the electronic device 201. According to an embodiment of the present disclosure, the display 260 may further include a control circuit for controlling the panel 262, the hologram device 264, or the projector 266. The interface 270 may include a high-definition multimedia interface (HDMI) 272, a USB 274, an optical interface 276, or a D-subminiature (D-sub) 278. The interface 270 may be included in the communication interface 170. Additionally or alternatively, the interface 270 may include a mobile high-definition link (MHL) interface, a SD card/MMC interface, or an Infrared Data Association (IrDA) standard interface.

The audio module 280 may convert a sound to an electrical signal and vice versa. At least some components of the audio module 280 may be included in the input/output interface 150. The audio module 280 may process voice information input or output through a speaker 282, a receiver 284, earphones 286, or the microphone 288. The camera module 291 is a device which may photograph a still image and a video. According to various embodiments of the present disclosure, the camera module 291 may include one or more image sensors (e.g., a front sensor or a back sensor), a lens, an ISP or a flash (e.g., LED or xenon lamp). The power management module 295 may manage power of the electronic device 201. According to an embodiment of the present disclosure, the power management module 295 may include a power management integrated circuit (PMIC), a charger IC, or a battery gauge. The PMIC may use a wired and/or wireless charging method. The wireless charging method may include a magnetic resonance method, a magnetic induction method, an electromagnetic wave method, etc. Additional circuits (e.g., a coil loop, a resonance circuit, a rectifier, etc.) for wireless charging may be further included. The battery gauge may measure a residual quantity of the battery 296, and a voltage, a current, or a temperature while charging. The battery 296 may include a rechargeable battery and/or a solar battery.

The indicator 297 may display a particular state (e.g., a booting state, a message state, a charging state, etc.) of the electronic device 201 or a part (e.g., the processor 210) of the electronic device 201. The motor 298 may convert an electrical signal into a mechanical vibration, and may generate a vibration, a haptic effect, etc. The electronic device 201 may include a processing device (e.g., a GPU) for supporting a mobile TV. The processing device for supporting a mobile TV may process media data according to a certain standard such as digital multimedia broadcasting (DMB), digital video broadcasting (DVB), or mediaFLO™. According to an embodiment of the present disclosure, each of the above-described component elements of hardware may be configured with one or more components, and the names of the corresponding component elements may vary based on the type of electronic device. The electronic device may include at least one of the above-described elements. Some of the above-described elements may be omitted from the electronic device, or the electronic device may further include additional elements. Also, some of the hardware components may be combined into one entity, which may perform functions identical to those of the relevant components before the combination.

Figure 3:
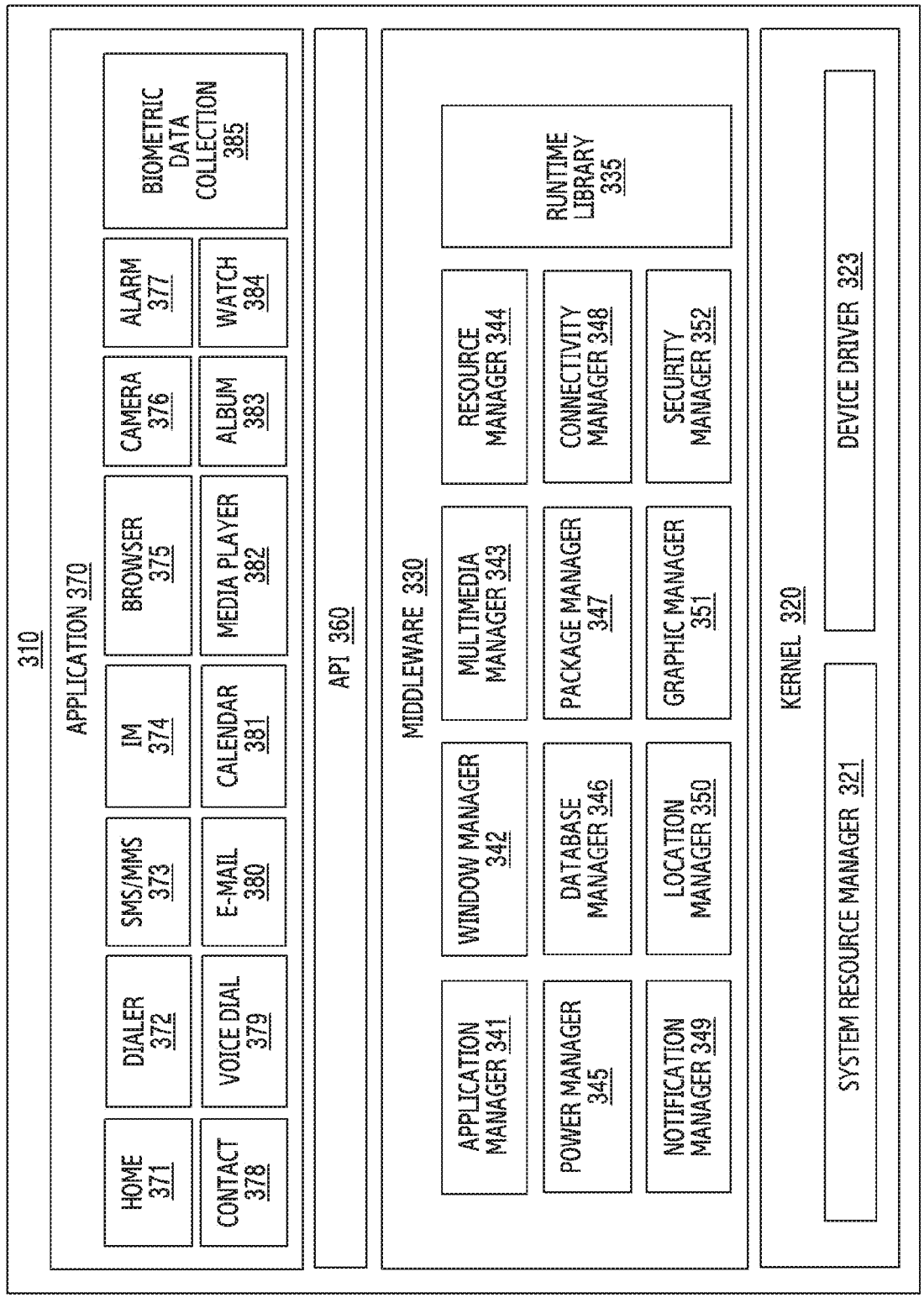
FIG. 3 is a block diagram of a program module according to various embodiments of the disclosure.

FIG. 3 is a block diagram illustrating a configuration of a program module, according to various embodiments of the present disclosure; According to an embodiment of the present disclosure, the program module 310 may include an OS for controlling resources related to the electronic device 101 and/or applications 147 executed in the OS. The OS may comprise Android™, iOS™, Windows™, Symbian™, Tizen™, Bada™, etc. Referring to FIG. 3, the program module 310 may include a kernel 320, middleware 330, an API 360, and/or applications 370. According to various embodiments of the present disclosure, at least some of the program module 310 may be preloaded on an electronic device, or may be downloaded from an external electronic device (e.g., the electronic device 102 or 104, or the server 106).

The kernel 320 may include a system resource manager 321 and/or a device driver 323. The system resource manager 321 may control, allocate, or collect system resources. According to various embodiments of the present disclosure, the system resource manager 321 may include a process management unit, a memory management unit, a file system management unit, etc. The device driver 323 may include a display driver, a camera driver, a Bluetooth™ driver, a shared memory driver, a USB driver, a keypad driver, a Wi-Fi driver, an audio driver, or an inter-process communication (IPC) driver. The middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 may include a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

According to various embodiments of the present disclosure, runtime library 335 may include a library module which a compiler uses in order to add a new function through a programming language while an application 370 is being executed. The runtime library 335 may perform input/output management, memory management, the functionality for an arithmetic function, etc. According to various embodiments of the present disclosure, the application manager 341 may manage, a life cycle of the applications 370. The window manager 342 may manage the graphical user interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370. According to various embodiments of the present disclosure, power manager 345 may operate together with a basic input/output system (BIOS) or the like to manage a battery or power source, and may provide power information or the like required for the operations of the electronic device. The database manager 346 may generate, search for, and/or change a database to be used by at least one of the applications 370. The package manager 347 may manage installation or an update of an application distributed in a form of a package file.

The connectivity manager 348 may manage wireless connectivity such as Wi-Fi or Bluetooth. The notification manager 349 may display or notify of an event such as an arrival message, promise, proximity notification, etc. in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, etc. According to an embodiment of the present disclosure, when the electronic device 101 provides a telephone call function, the middleware 330 may further include a telephony manager for managing a voice call function or a video call function of the electronic device. According to various embodiments of the present disclosure, middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components. The API 360 includes a set of API programming functions, and may be provided with a different configuration according to an OS. In the case of Android or iOS, one API set may be provided for each platform. In the case of Tizen, two or more API sets may be provided for each platform.

The applications 370 may include one or more applications which provide functions such as a home 371 application, a dialer 372 application, an SMS/MMS 373 application, an instant message (IM) 374 application, a browser 375 application, a camera 376 application, an alarm 377 application, a contacts 378 application, a voice dial 379 application, an email 380 application, a calendar 381 application, a media player 382 application, an album 383 application, a watch 384 application, a healthcare application (e.g., measuring exercise quantity or blood sugar level), or an environment information application (e.g., providing atmospheric pressure, humidity, or temperature information). According to various embodiments of the present disclosure, applications 370 may include an information exchange application that can support the exchange of information between the electronic device and an external electronic device. The information exchange application may include a notification relay application for transferring specific information to an external electronic device or a device management application for managing an external electronic device. According to various embodiments of the present disclosure, the notification relay application may include a function of transferring, to the external electronic device, notification information generated from other applications of the electronic device 101 (e.g., an SMS/MMS application, an e-mail application, a health management application, or an environmental information application). Further, the notification relay application may receive notification information from an external electronic device and provide the received notification information to a user. According to various embodiments of the present disclosure, the device management application may manage (e.g., install, delete, or update) at least one function of an external electronic device communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service). According to various embodiments of the present disclosure, the applications 370 may include applications (e.g., a healthcare application of a mobile medical appliance or the like) designated according to an external electronic device. The applications 370 may include an application received from an external electronic device. The applications 370 may include a preloaded application or a third party application that may be downloaded from a server. The names of the components of the program module 310 may change depending on the type of OS. According to various embodiments of the present disclosure, at least a part of the programming module 310 may be implemented in software, firmware, hardware, or a combination of two or more thereof. At least some of the program module 310 may be implemented (e.g., executed) by the processor. At least some of the program module 310 may include a module, a program, a routine, a set of instructions, and/or a process for performing one or more functions.

As described above, an electronic device according to various embodiments may acquire biometric data by using a biometric sensor 2401 and register biometric information based on the biometric data. The disclosure may be applied to various types of biometric information, such as a fingerprint, an iris, heart rate, blood pressure, and body heat. Hereinafter, however, a fingerprint is presented as one example of the biometric data for specificity of description. However, various embodiments described later may also be applied to other types of biometric information.

In various embodiments, the electronic device 101 may determine the identity of a user by registering a fingerprint of the user and authenticating the input fingerprint based on registered fingerprint information. Generally, about twenty fingerprint images for one fingerprint may be stored at the time of fingerprint registration. Therefore, the number of fingerprint images to be checked at the time of fingerprint authentication becomes larger, and thus may cause performance degradation in terms of memory use and processing speed.

Therefore, if fingerprint images to be checked at the time of fingerprint authentication can be limited to some of registered fingerprint images, the efficiency of the fingerprint authentication can be enhanced. The disclosure proposes a technology for storing, in an electronic device having a fingerprint sensor disposed in at least a partial region of a display, both fingerprint data acquired through a fingerprint sensor and touch information acquired through a touch sensor of a display when fingerprint information of a user is generated and clustering fingerprint images corresponding to similar touch information (for example, area). Further, the disclosure proposes a technology which can enhance the fingerprint recognition speed by determining a candidate group, for which a matching algorithm is to be performed based on a touch region, among stored fingerprint images.

First, some terms used in the description below are defined as follows.

The term "fingerprint" is an example of biometric information and may mean patterns of curved lines formed on the skin of the end of a finger of the human body. Further, the fingerprint may mean curved patterns remaining on the surface of an object when the object is pressed by the end of a finger.

The term "fingerprint data" may mean data indicating the entirety or a part of a fingerprint acquired by a sensor (e.g. biometric sensor 240I) included in the electronic device 101. Specifically, the fingerprint data may mean measurement values of a sensor, data generated from the measurement values of the sensor, stored data, etc. The fingerprint data may be acquired in an image form. Therefore, each data chunk constituting the fingerprint data may be referred to as "fingerprint image". That is, the fingerprint data is a set of at least one fingerprint image. However, the form of fingerprint data, to which the disclosure can be applied, is not limited to an image. In various embodiments, the fingerprint data are generated and classified by a fingerprint sensor and may be used for fingerprint registration.

The term "fingerprint information" may mean a set of fingerprint data which can be used for authentication. For example, the fingerprint information, which is a set of fingerprint data on a fingerprint of the same finger, may be a set of fingerprint data which has gone through a fingerprint registration process. The fingerprint information is generated through the fingerprint registration process and may include fingerprint data acquired through a fingerprint registration application and fingerprint data acquired through at least one other application. The fingerprint information may be referred to as "a registered fingerprint", "registered fingerprint data", "a template", or other terms having a technical meaning equal thereto.

The term "touch information" is information related to a touch input and may include measurement values or parameters derived from the measurement values. For example, the touch information may include at least one among coordinates, an area, a major axis length, a minor axis length, an orientation, an angle, a curvature, a pressure, and a position of a touch input. The major axis length may be defined as a length of a longer dimension among touch contacts or a cross-sectional area of a touch contact. The minor axis length may be defined as a length of a shorter dimension among touch contacts. The orientation is a tool for angular measurement and may be defined as a direction of a touch. The position may be defined as a position relative to a fingerprint sensor. In various embodiments, the touch information may be used in registering and authenticating a fingerprint. For example, the touch information may be stored together with fingerprint data. The touch information may be used to classify the fingerprint data.

Figure 4A:
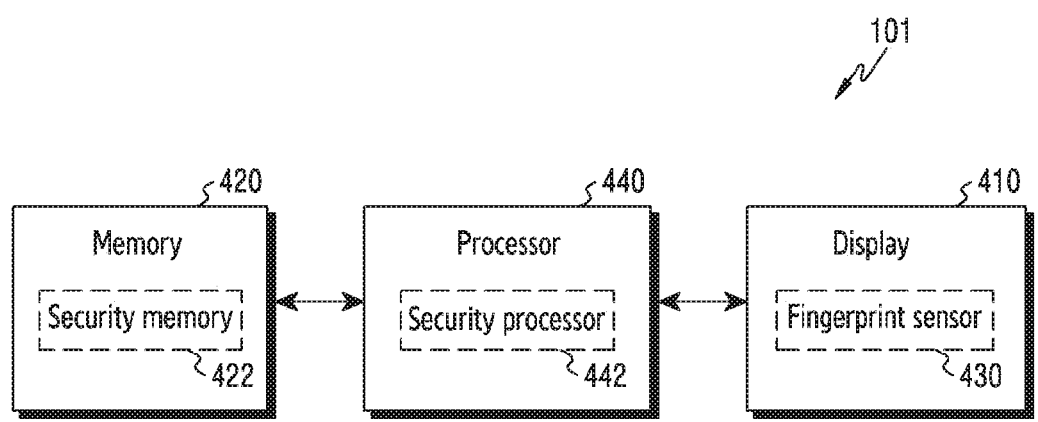
FIG. 4A illustrates a functional configuration of an electronic device according to various embodiments of the disclosure.

FIG. 4A illustrates a functional configuration of an electronic device according to various embodiments of the disclosure.

Referring to FIG. 4A, the electronic device 101 may include, for example, a display 410, a memory 420, a fingerprint 430, and a processor 440. A part of the memory 420 is used as a security memory 422 and the processor 440 may include a security processor 432.

The display 410 may be a unit for a screen display of the electronic device 101. For example, the display 410 may be configured as one selected from among an OLED, Quantum-Dot Light Emitting Diode (QLED), and LCD. The display 410 may be a constituent element corresponding to a display 160 in FIG. 1 and a display 260 in FIG. 2. Further, although not shown in FIG. 4A, the display 410 may include a touch sensor and a touch Integrated Circuit (IC). The touch sensor may detect a change in a measurement value according to a touch input of a user and the touch IC may provide a measurement value to the processor 440. The measurement value may be one among a change amount of capacitance in a capacitive type, a voltage difference generated due to a change of resistance in a resistive type, an amplitude change of a wave in an ultrasonic type, and an intensity of an infrared signal in an infrared type.

The memory 420 may store a basic program for an operation of the electronic device 101, an application program, and data such as setting information. The memory 420 may be configured as a volatile memory, a nonvolatile memory, or a combination of the volatile memory and the nonvolatile memory. The memory 420 may provide stored data in response to the request of the processor 440. The memory 420 may store fingerprint data acquired through the fingerprint sensor 430 and may store registered fingerprint information. The security memory 422 is a physical part of the memory 420 and may be defined as a memory region for specific address values. The security memory 422 may provide enhanced protection to the stored data by allowing a limited access thereto unlike other regions. For example, the security memory 422 may be defined for a Trust Execution Environment (TEE). According to one embodiment, in the memory 420, the security memory 422 and the remaining memories may have different security levels. Therefore, the memories other than the security memory 422 may be "normal memories". According to one embodiment, the registered fingerprint information may be stored in the security memory 422. According to another embodiment, the security memory 422 may be used for storing collected and unregistered fingerprint data.

The fingerprint sensor 430 may be a constituent element for acquiring fingerprint data of a user. The fingerprint sensor 430 may generate a measurement value regarding a fingerprint at the time of the touch input of the user. The fingerprint sensor 430 may be implemented in various types, such as an optical type, a mutual capacitance type, an ultrasonic type, and an infrared type. In various embodiments of the disclosure, the fingerprint sensor 430 has a structure in which the fingerprint sensor is integrated with the display 410. Therefore, the fingerprint sensor 430 may be referred to as "a display integrated fingerprint-sensor". For a sensing operation of the fingerprint sensor 430, the display 410 may include a region through which light can pass. The fingerprint sensor 430 may generate fingerprint data through the region through which light can pass.

For example, the fingerprint sensor 430 may be designed according to one among an in/on-cover glass structure in which an electrode or a sensing module for fingerprint sensing is arranged, through printing or etching, on the surface of a cover glass provided on the display 410 in order to protect the display 410, an over-display structure in which an electrode or a sensing module for fingerprint sensing is installed over a display panel, an under-display structure in which an electrode or a sensing module for fingerprint sensing is installed under a display panel, and an in-display structure in which an electrode or a sensing module for fingerprint sensing is installed in a Black Maker (BM) region between pixels of a display panel or inside pixels of the display panel.

The processor 440 may control the overall operation of the electronic device 101. For example, the processor 440 may control a screen display of the display 410 and may control a measurement operation of the fingerprint sensor 430. The processor 440 may include a processor 120 in FIG. 1 and a processor 210 in FIG. 2. The processor 440 may generate fingerprint data by using measurement values generated by the fingerprint sensor 430, may register a fingerprint, and may authenticate the fingerprint. In order to provide an enhanced security for fingerprint registration and authentication, the processor 440 may include a security processor 442. The security processor 442 may be an independent processor installed inside of the processor 440 or a set of instruction registers separately defined for security-required processing.

According to various embodiments of the disclosure, the processor 440 may store, in the memory 420, information on a touch input, that is, touch information together with fingerprint information at the time of fingerprint registration. In other words, the touch information may be stored as attribute information of the fingerprint information. The processor 440 may use the touch information to select fingerprint information to be used for checking. A region corresponding to the fingerprint sensor 430 may include a physical range including the entirety or a part of a region, in which the fingerprint sensor 430 is installed, among active regions of the display 410. For example, the processor 440 may control functions for fingerprint registration and authentication according to various embodiments described below.

Figure 4B:
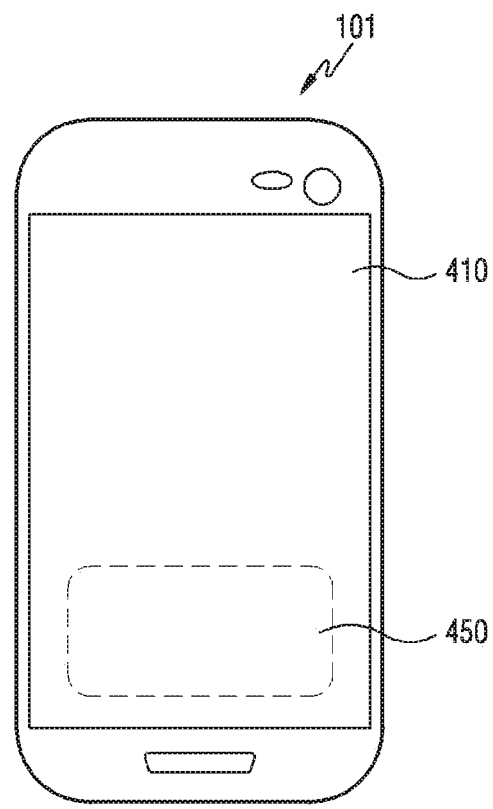
FIGS. 4B and 4C illustrate examples of an arrangement of a display and a biometric sensor in an electronic device according to various embodiments of the disclosure.
Figure 4C:
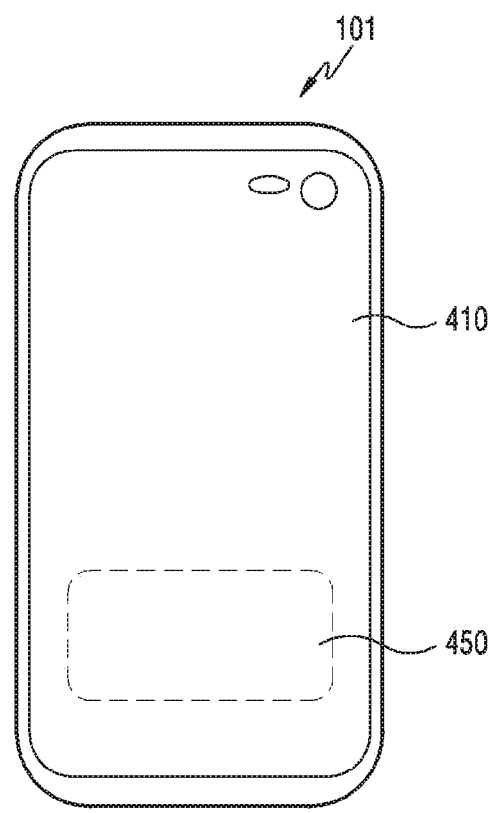

In the configuration of the electronic device 101 described in reference to FIG. 4A, the fingerprint sensor 430 is an example of a biometric sensor. FIG. 4A illustrates an example of a functional structure of the electronic device 101, and the display 410 and the biometric sensor (for example, fingerprint sensor 430) may be arranged as in FIGS. 4B and 4B. FIGS. 4B and 4C illustrate examples of an arrangement of a display and a biometric sensor in an electronic device according to various embodiments of the disclosure. FIGS. 4B and 4C are an example of electronic device 200 or 230 according to various embodiments of the disclosure. Referring to FIG. 4B, in the electronic device 101, a biometric sensor 450 (for example, fingerprint sensor 430) for recognizing biometric information (for example, fingerprint information) may be disposed in at least a partial region of the display 410. Because the biometric sensor 450 is disposed in the at least part of the display 410 (for example, an active region or BM region of the display), acquiring biometric information on a user may be performed by using a user input to the display 410. Referring to FIG. 4C, the electronic 230 includes a biometric sensor 450 (for example, fingerprint sensor 430) on at least a part of the display 410 and may extend the size of the display by forming a region occupied by the biometric sensor 450 as the display 410.

Figure 4D:
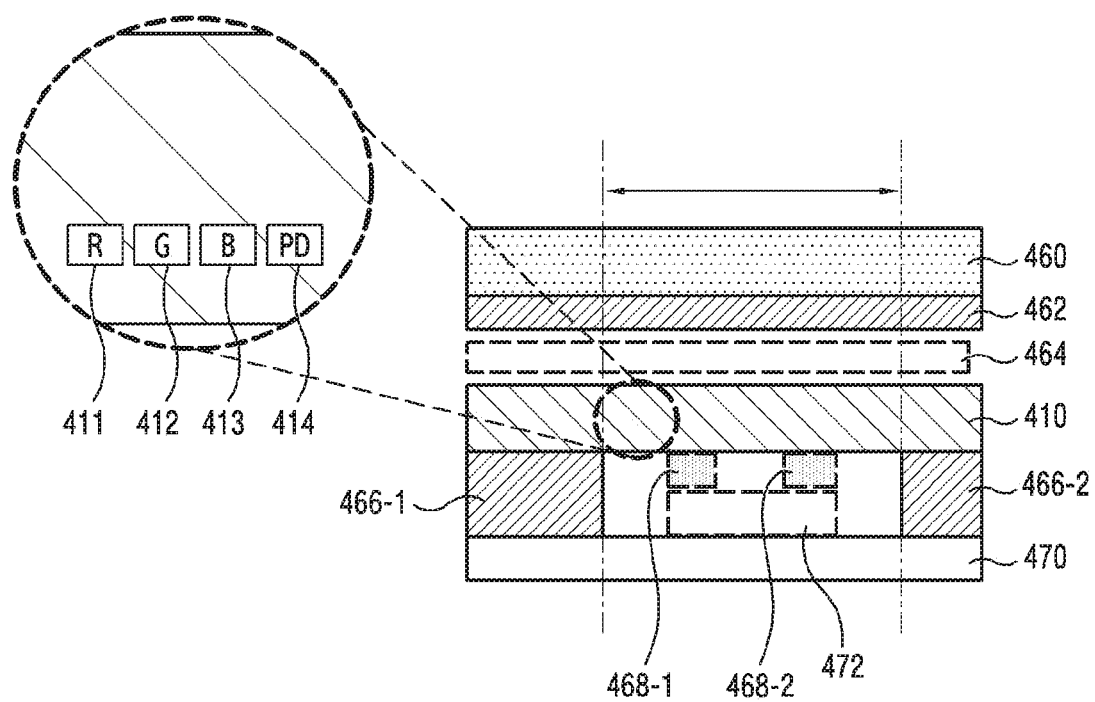
FIG. 4D illustrates an example of a coupling structure between a display and a biometric sensor in an electronic device according to various embodiments of the disclosure.

The biometric sensor 450 may be integrated with the display 410 as described above. In accordance with one embodiment, the biometric sensor 450 and the display 410 may be coupled as in FIG. 4D. FIG. 4D illustrates an example of a coupling structure between the display and the biometric sensor in an electronic device according to various embodiments of the disclosure. FIG. 4D is an example of a structure in which a biometric sensor (for example, fingerprint sensor 430) for sensing biometric information of a user is mounted in at least a partial region of the display 410 of the electronic device 101 according to various embodiments of the disclosure. According to one embodiment, the electronic device 101 may include glass 460, the display 410, a fingerprint sensor 472, or a printed circuit board (PCB) 470. According to one embodiment, the electronic device 101 may further include structures 466-1 and 466-2 for securing a space for mounting the biometric sensor 450. The structures 466-1 and 466-2 may constitute at least a part of a sealing structure for protecting the fingerprint sensor 472.

According to one embodiment, a biometric sensor (for example, fingerprint sensor 430 or fingerprint sensor 472) capable of sensing biometric information may be disposed on one surface of the display 410 (for example, an upper surface) (for example, a separate layer 464 formed on one surface of the display, at least a partial region, in which pixels 411 to 413 are formed, of the surface of the display, or the like). According to one embodiment, the biometric sensor (for example, fingerprint sensor 430, fingerprint sensor 472) may be disposed on the other surface (for example, the rear surface) of the display 410. The biometric sensor (for example, fingerprint sensor 430, fingerprint sensor 472) may include, for example, an optical type image sensor, an ultrasonic type transmission/reception module, or a capacitive type transmission/reception electrode pattern.

According to various embodiments, the biometric sensor (for example, fingerprint sensor 430, fingerprint sensor 472) may be disposed between an adhesive layer 462 and the display 410 or between the glass 460 and the adhesive layer 462. According to one embodiment, the biometric sensor (for example, fingerprint sensor 430, fingerprint sensor 472) may be formed as a capacitive type transmission/reception electrode pattern, and may be formed as a transparent electrode in order to enhance transmittance of light output from the display 410. According to one embodiment, the biometric sensor (for example, fingerprint sensor 430, fingerprint sensor 472) may also include an ultrasonic type transmission/reception module.

According to various embodiments, in the electronic device, the biometric sensor (for example, fingerprint sensor 430, fingerprint sensor 472) may be disposed on the other surface of the display 410. Elastic bodies 468-1 and 468-2 (for example, sponge or rubber) are arranged between the biometric sensor (for example, fingerprint sensor 472) and the display 410 so as to alleviate an impact between the biometric sensor and the display 410 or prevent foreign substances from being introduced. According to one embodiment, the biometric sensor (for example, fingerprint sensor 430, fingerprint sensor 472) may include an image sensor. For example, the image sensor outputs light (for example, visible light, infrared rays, or ultraviolet rays) emitted from a light source (for example, display 410 or IR LED) onto a fingerprint of a user, and may sense light reflected by the fingerprint of the user by means of the image sensor.

The electronic device 101, described with reference to FIG. 4A, may include one processor 440. However, in accordance with other embodiments, the electronic device 101 may include two or more processors. The two or more processors are classified based on power consumption amount, assigned functions, etc. Hereinafter, the configuration of the electronic device 101 including the two or more processors will be described with reference to FIG. 5A and FIG. 5B.

Figure 5A:
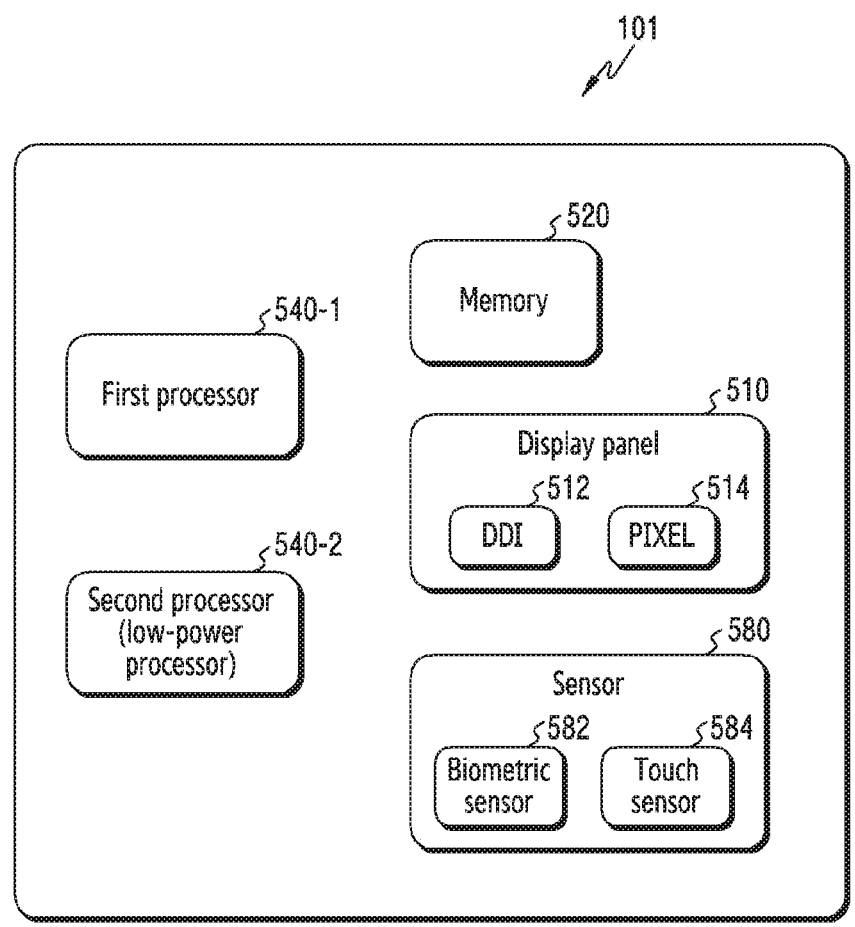
FIG. 5A illustrates another functional configuration of an electronic device according to various embodiments of the disclosure.

FIG. 5A illustrates another functional configuration of an electronic device according to various embodiments of the disclosure. FIG. 5A illustrates an example of a configuration of the electronic device 101 according to various embodiments of the disclosure.

Referring to FIG. 5A, the electronic device 101 may include, for example, at least one processor (for example, a first processor 540-1 or second processor 540-2), a memory 520, a display 510, or at least one sensor 580. According to one embodiment, the first processor 540-1 may control overall driving of the electronic device. When the electronic device 101 is in a sleep state, the second processor 540-2 (for example, low-power processor or sensor HUB) may process sensor information acquired through the at least one sensor 580 or an input acquired from a user without waking up the first processor 540-1. According to one embodiment, the second processor 540-2 may control a biometric sensor 582, a touch sensor 584, or the display 510 independently from the first processor 540-1. The electronic device 101 according to one embodiment may include the memory 520. The memory 520 may include a normal region for storing a user application, etc. or a security region for storing security-sensitive information, such as information for fingerprint sensing.

According to one embodiment, the display 510 may include: a display panel including multiple pixels; and a display driving module (for example, Display Driver IC (DDI) 512) configured to control at least some of the multiple pixels 514 included in the display panel and provide display information. According to one embodiment, the sensor 580 may include a biometric sensor 582 (for example, a fingerprint sensor 530 or a touch sensor 584 configured to sense a user's touch on the display 510) for sensing a user's fingerprint on the display 510. According to one embodiment, the biometric sensor 582 may include an optical fingerprint sensor (for example, image sensor) which uses light output by the display module as a light source.

According to various embodiments, the at least one sensor 580 may drive the multiple pixels 514 included in the display panel through the DDI 512 in response to the user's input. According to one embodiment, the at least one sensor 580 may control the display panel as necessary. For example, in order to acquire biometric information of a user, the biometric sensor 582 may control the display panel and use light emitted from the display panel.

Figure 5B:
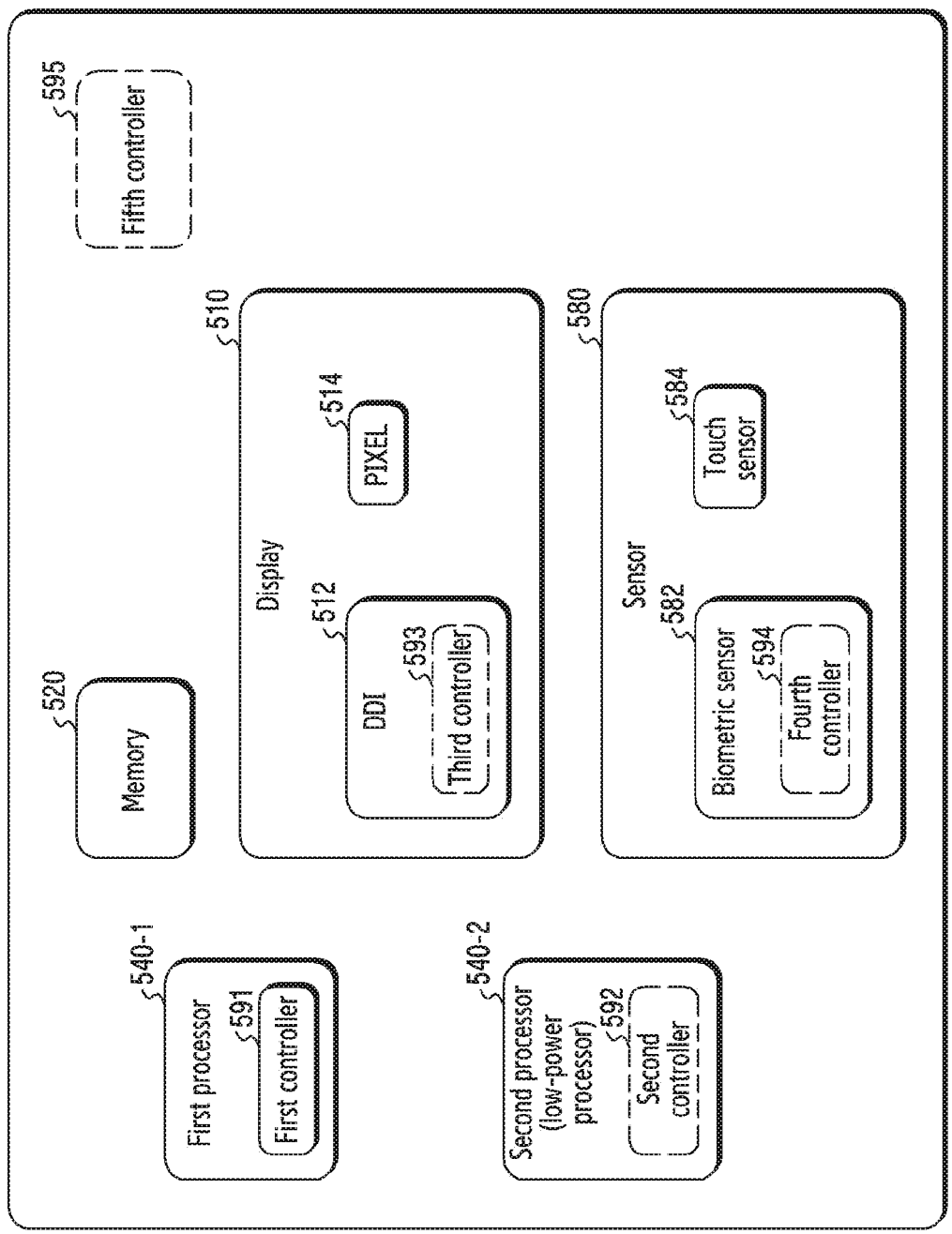
FIG. 5B illustrates another functional configuration of an electronic device according to various embodiments of the disclosure.

FIG. 5B illustrates another functional configuration of an electronic device according to various embodiments of the disclosure. FIG. 5B illustrates an example of a configuration of the electronic device 101 according to various embodiments of the disclosure.

Referring to FIG. 5B, the electronic device 101 may include multiple controllers (for example, a first controller 591, a second controller 592, a third controller 593, a fourth controller 594, and a fifth controller 595), and each controller may be included in a module (for example, first processor 540-1, second processor 540-2, DDI 512, or biometric sensor 582) included in the electronic device 101. For example, the electronic device 101 may use the first controller 591 to control the first processor 540-1 and may use the second controller 592 to control the second processor 540-2. Further, the electronic device 101 may use the third controller 593 and the fourth controller 594 to control a module including the third controller 593 and the fourth controller 594.

According to one embodiment, one controller may be used to control a module of the electronic device 101. For example, the electronic device 101 may use a main controller (for example, fifth controller 595) to control multiple controllers (for example, first controller 591, second controller 592, third controller 593, and fourth controller 594). Further, the electronic device 101 may designate the main controller and may control the other controllers by using the designated main controller. For example, the electronic device may change/designate the main controller from the controller 595 to the first controller 591 and may control the other controllers by using the designated main controller.

According to one embodiment, the electronic device 101 may use one controller to directly control modules. For example, the electronic device 101 may use the first controller 591 included in the first processor 540-1 to control the second processor 540-2, the memory 520, the display 510, and/or the at least one sensor 580. Further, according to one embodiment, the electronic device 101 may control the display 510 and the at least one sensor 580 by one controller. For example, in the case of an optical fingerprint sensor using the display 510 as a light source, the electronic device 101 may use one controller to control the display 510 and the sensor 580, and may easily acquire a user's biometric information.

In the above-described configuration of the electronic device 101, the fingerprint sensor 430 may generate data regarding a user's fingerprint. The fingerprint sensor 430 may operate according to an optical, capacitive, or ultrasonic manner. The optical manner may be a manner using a photosensitive diode to capture an image of a fingerprint on the surface of a finger and acquire the fingerprint. The capacitive manner may be a manner using a principle wherein a part (ridge) of a fingerprint, which is brought into contact with an electrode, is sensed and a part (valley) of the fingerprint, which is not brought into contact with the electrode, is not sensed. The ultrasonic manner may be a manner generating ultrasonic waves by using, for example, piezo and acquiring a fingerprint by using a path difference of an ultrasonic wave which meets and then is reflected by ridges and valleys of the fingerprint. Hereinafter, each manner will be described in detail with reference to FIGS. 6A to 6C.

Figure 6A:
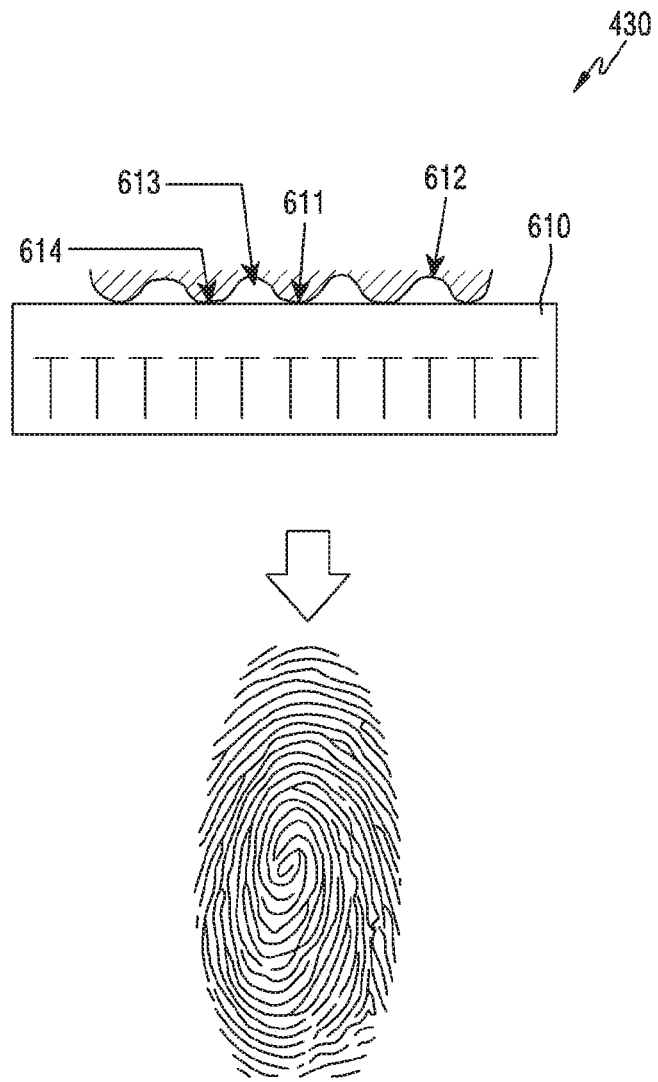
FIGS. 6A to 6C illustrate examples of fingerprint sensors for fingerprint recognition in an electronic device according to various embodiments of the disclosure.
Figure 6B:
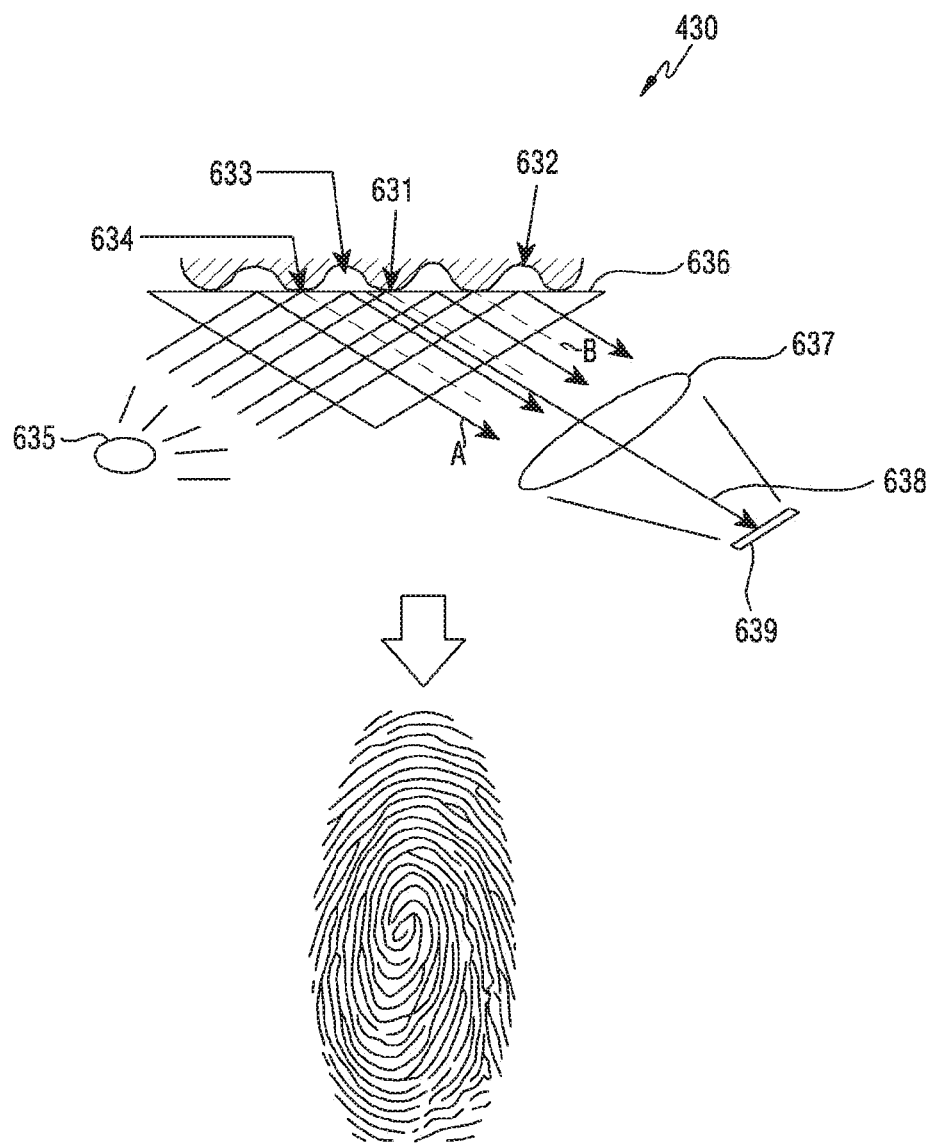
Figure 6C:
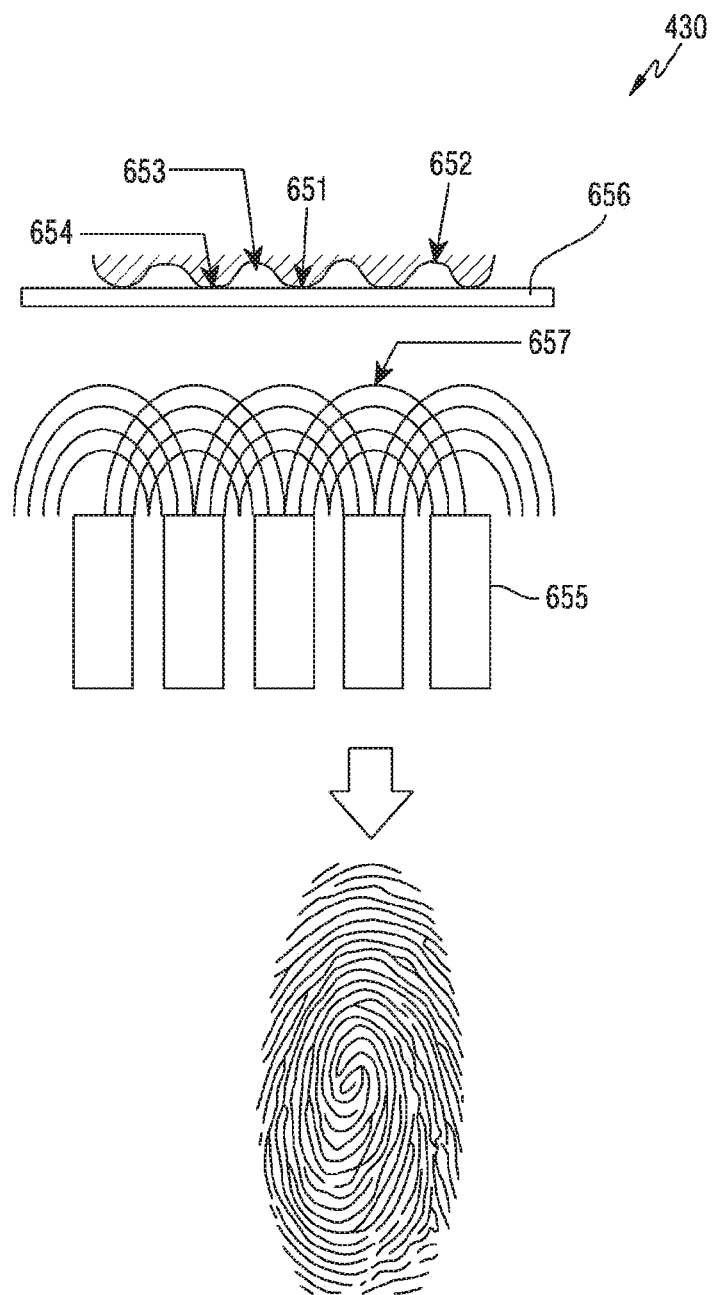

FIGS. 6A to 6C illustrate examples of fingerprint sensors for fingerprint recognition in an electronic device according to various embodiments of the disclosure.

FIG. 6A illustrates an example of a capacitive sensor. A fingerprint sensor 630 illustrated in FIG. 6A may include a micro-capacitor plate 610. The fingerprint sensor 630 may detect a difference between a voltage of a contact point 614 of a region in which a ridge 611 of the surface of a finger on the micro-capacitor plate 610 is positioned and a voltage of an air region 613 which a valley 612 is positioned. The fingerprint sensor 630 may transfer information regarding the voltage difference to a processor 640, and the processor 640 may generate fingerprint data from the information transferred from the fingerprint sensor.

FIG. 6B illustrates an example of a structure using light. The fingerprint sensor 630 may identify a position of a ridge 631 and a position of a valley 632 in a region, in which a touch occurs, based on information on light which has been emitted from a light source 635 and has passed through a glass prism 636 and a lens 637. More specifically, the light source 635 emits light for detecting a fingerprint, and the light emitted from the light source 635 may be incident on the glass prism 636. When the light incident on the glass prism 636 reaches an air region 633 without any contact, the light is specularly reflected at a reflection angle identical to an incident angle and thus may form optical path A. On the other hand, when the light incident on the glass prism 636 reaches a contact point 634, the light is absorbed without being reflected and thus may not form optical path B. The light reflected in the air region 633 is refracted through the lens 637 and may reach an optical detector 639. The optical detector 639 may identify a region, which light has reached, as a region where a valley 632, which is not brought into contact with the light, is positioned, and may identify a region, which light has not reached, as a region where the ridge 631, which is brought into contact with the light, is positioned. The optical detector 639 may be implemented through a Charge Coupled Device (CCD) or a Complementary Metal-Oxide-Semiconductor (CMOS).

FIG. 6C illustrates an example of a structure using ultrasonic waves. As illustrated in FIG. 6C, the fingerprint sensor 630 may include at least one transducer 655. The transducer 655 may transmit an ultrasonic signal 671 to a display panel 656, and may convert the ultrasonic signal reflected from the display panel 656 into an electrical signal to generate a signal for identifying a touch pattern on the display panel 656. More specifically, among ultrasonic signals, an ultrasonic signal, which is reflected in a region 651 in which a ridge is positioned, reaches to the transducer 655 more quickly than an ultrasonic signal reflected in a region 652 in which a ridge is positioned. The transducer 655 may generate an electrical signal reflecting a difference in arrival time of ultrasonic signals. The transducer 655 may transmit the generated electrical signal to the processor 640, and the processor 640 may acquire fingerprint information from the transmitted signal.

Generally, the detection sensitivity of a fingerprint may relatively change greatly depending on a distance to a touch input. In other words, when the fingerprint sensor is installed to be a predetermined distance away from a position in which a touch input occurs, the detection sensitivity becomes worse and thus a fingerprint having accuracy above a predetermined level may not be detected. Therefore, for a more precise detection, as shown in FIG. 6A, a fingerprint sensor based on a capacitive sensor may be positioned in a region having a depth within a region (for example, 50 μm) relatively closer to the outer surface of the display panel of the display 610 when compared with other fingerprint sensors (for example, optical sensor, ultrasonic sensor). Whereas, because the structure in FIG. 6B uses light, the optical detector may be installed in a region having a larger depth from the surface of the display panel when compared with the capacitive sensor in FIG. 6A. For example, the optical detector 639 may be installed in a position 1000 μm away from the surface of the display panel. Further, the fingerprint sensor using ultrasonic waves, shown in FIG. 6C, may be installed in a region deeper from the surface of the display panel than a fingerprint sensor having the structure in FIG. 6A or 6B.

Figure 7A:
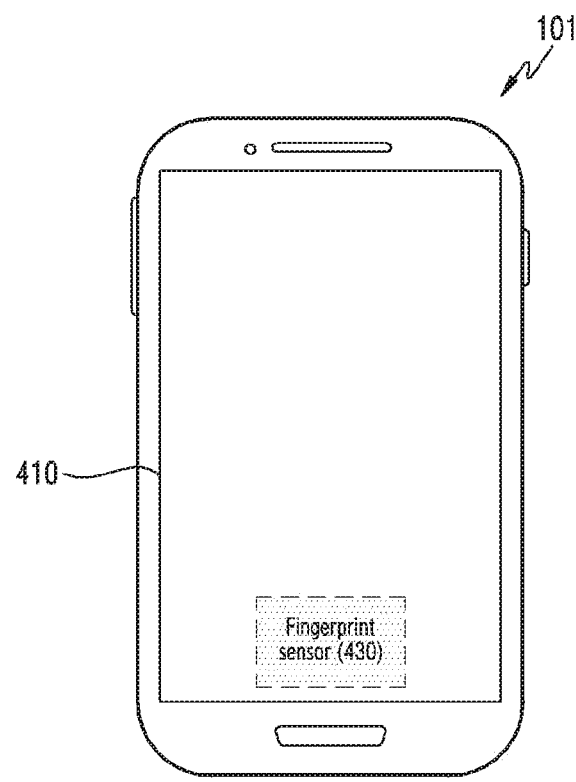
FIGS. 7A and 7B illustrate examples of the installation of a fingerprint sensor in an electronic device according to various embodiments of the disclosure.
Figure 7B:
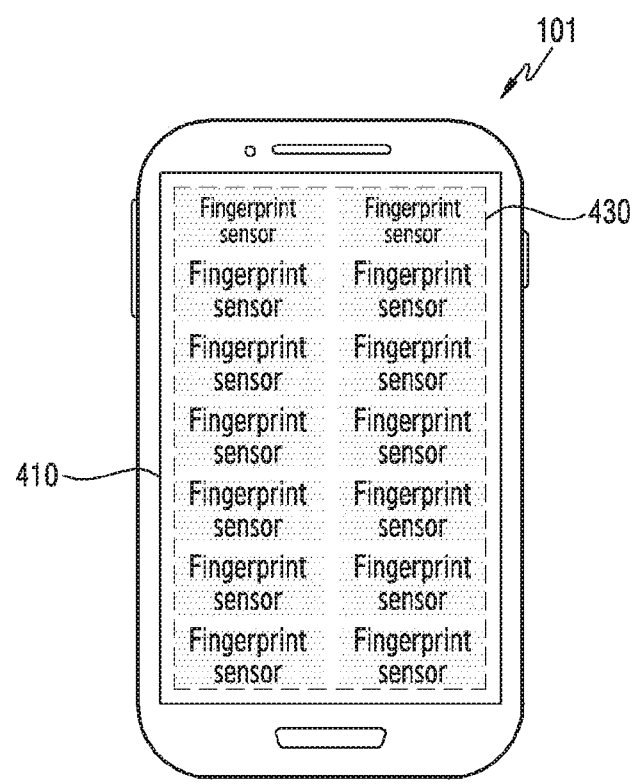

In the above-described configuration of the electronic device 101, the fingerprint sensor 430 may be installed to be integrated with the display 410. According to one embodiment, the fingerprint sensor 430 may be installed as shown in FIG. 7A or 7B below. FIGS. 7A and 7B illustrate examples of fingerprint sensors in an electronic device according to various embodiments of the disclosure.

Referring to FIG. 7A, the fingerprint sensor 430 is position in a partial region of a panel of the display 410, and the electronic device 101 may perform fingerprint recognition through the partial region. The fingerprint sensor 430 is positioned only in the partial region instead of the entire region of the display panel, thereby allowing the reduction of costs necessary for a production process. The region, in which the fingerprint sensor 430 is positioned, on the display 410 may be referred to as "a fingerprint sensor region". That is, the fingerprint sensor region is a region, in which a fingerprint can be sensed, among the content display region of the display 410, and may include, according to an embodiment, one sub-region inside the display region, multiple visibly separate sub-regions, or the entire region of the display region.

Referring to FIG. 7B, the fingerprint sensor 430 may be installed across a panel of the display 410. That is, the fingerprint sensor 430 may be installed in a form where multiple sensing elements are arranged. Therefore, fingerprint recognition may be performed through the entire region of the display 410. The fingerprint sensor 430 is positioned in the entire region of the display 410 instead of a partial region thereof and thus a fingerprint can be input in any region desired by a user in the panel of the display 410, thereby increasing a user's experience.

As described above, the fingerprint sensor 430 may have a structure in which the fingerprint sensor 430 is integrated with the display 410. Because the fingerprint sensor 430 is embedded in the display 410, a touch input may be naturally generated while a user inputs a fingerprint on the display 410. That is, touch information may be provided from a touch sensor of the display 410 while fingerprint data is acquired. By using additional information such as the touch information, the electronic device 101 according to various embodiments may increase a recognition rate and may improve a matching speed.

In various embodiments of the disclosure, the electronic device 101 may include a display including a touch sensor, a fingerprint sensor configured to acquire fingerprint data through at least a partial region of the display region of the display, and a processor. The processor may be configured to: acquire, in response to a first user input for registering a user's fingerprint, first touch information from the first user input by using the touch sensor; acquire first fingerprint data by using the fingerprint sensor; register the first fingerprint data as fingerprint information based on the first touch information, the registering including classifying the first fingerprint data based on the first touch information; acquire, in response to a second user input for authenticating the user's fingerprint, second touch information from the second user input by using the touch sensor; acquire second fingerprint data by using the fingerprint sensor; select a candidate group for comparison from among the fingerprint information based on the second touch information; and compare fingerprint data included in the candidate group with the second fingerprint data.

The processor may be configured to: identify a hand holding the electronic device at the time of the generation of the first fingerprint data by using the first touch information; and classify the first fingerprint data based on the hand. Further, the processor may be configured to distinguish a normal touch and a tip touch from each other based on a curvature included in the first touch information. The processor may be configured to classify fingerprint data regarding the same finger into multiple groups based on an area included in the first touch information.

In various embodiments of the disclosure, the electronic device 101 may include: a display including a touch sensor; a fingerprint sensor configured to acquire fingerprint data through at least a partial region of the display region of the display; and a processor. The processor may be configured to: store information on a touch input occurring for fingerprint registration; and determine, using the information on the touch input, a candidate group for checking of matching of a fingerprint for fingerprint authentication.

The processor may be configured to classify the fingerprint data acquired for the fingerprint registration based on the information of the touch input. The candidate group may be determined based on the touch input occurring for the fingerprint authentication. The processor may be configured to: acquire a first fingerprint data for the fingerprint authentication; and determine another candidate group when there is no fingerprint data matching the first fingerprint data in the candidate group.

In various embodiments of the disclosure, the electronic device 101 may include a touch sensor included in a display region for displaying a content, a fingerprint sensor disposed in at least a partial region of the display region, and a processor. The processor may be configured to: acquire one or more user inputs through the at least partial region of the display region, the acquiring including acquiring one or more fingerprint data corresponding to the one or more user inputs and one or more touch information corresponding to the user inputs by using the fingerprint sensor; and register the one or more touch information and the one or more fingerprint data as one or more pieces of fingerprint information corresponding to a user.

The processor may be configured to: acquire a user input for performing authentication of the user through the at least partial region of the display region, wherein the acquiring of the user input includes acquiring fingerprint data corresponding to the user input and touch information corresponding to the user input. The processor may be configured to select at least one piece of corresponding touch information, which corresponds to the acquired touch information, from among the one or more pieces of corresponding touch information, at least based on the acquired touch information. The processor may be configured to designate at least one piece of fingerprint information, which corresponds to the fingerprint data among the one or more pieces of fingerprint information, as at least one candidate fingerprint for authentication of the user. The processor may be configured to compare the at least one candidate fingerprint with the fingerprint data.

The display includes a region through which light can pass, and the processor may be configured to acquire the one or more fingerprint data through the region through which light can pass. The fingerprint sensor may be disposed in an active region of the display. The touch information may include at least one among an area, a major axis length, a minor axis length, an orientation, an angle, a pressure, and a position of a user input.

The processor may be configured to store the one or more touch information as attribute information of the one or more pieces of fingerprint information. The processor may be configured to store the one or more pieces of fingerprint information in a security memory having a security level different from that of a normal memory. The processor may be configured to acquire the one or more touch information through a first region, in which the fingerprint sensor is disposed, of the display region and a second region near the first region. The processor may be configured to compare at least one among an area, a position, a width, a curvature, an orientation, and an angle with touch information of a user input acquired for authentication.

Figure 8:
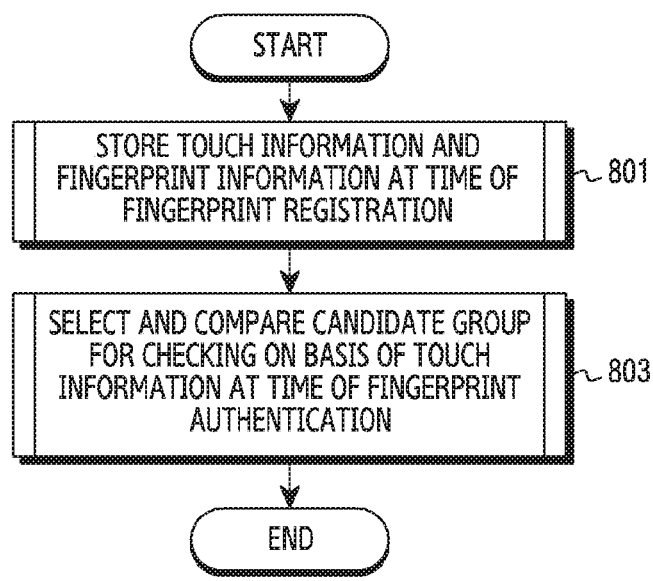
FIG. 8 is a flowchart for registering and authenticating a fingerprint in an electronic device according to various embodiments of the disclosure.

FIG. 8 is a flowchart for registering and authenticating a fingerprint in an electronic device according to various embodiments of the disclosure. FIG. 8 illustrates an example of an operation method of the electronic device 101.

Referring to FIG. 8, in operation 801, the electronic device 101 (for example, processor 440) may store touch information and fingerprint information at the time of fingerprint registration. The touch information may include information on a touch input occurring while acquiring the fingerprint data constituting fingerprint information. That is, the fingerprint sensor 430 included in electronic device 101 has a structure in which the fingerprint sensor 430 is integrated with the display 410, and a touch input may occur on the display 410 at the time of the input of a fingerprint through the fingerprint sensor 430. Thus, the processor 440 acquires touch information by using a touch sensor and fingerprint data by using the fingerprint sensor 430, and may store the touch information and the fingerprint data together. The processor 440 may store, as the fingerprint data, a fingerprint image as it is, may store a compressed fingerprint image, may store a feature point extracted from the fingerprint image, or may store an original fingerprint image in a converted form such that the original fingerprint image cannot be restored. The processor 440 may store all raw data provided from a touch IC, may store a level of an area expressed in a binary or natural number, may store pressure information, or may store a feature template indicating a feature extracted from a touch input. The fingerprint information may be stored in a storage space (for example, security memory 422) having a high security level. In other words, the processor 440 may register the fingerprint information.

In operation 803, the electronic device 101 (for example, processor 440) may select and compare a candidate group for checking based on touch information at the time of fingerprint authentication. The touch information may include information on a touch input occurring at the time of the input of a fingerprint for fingerprint authentication. That is, the processor 440 may compare the touch input occurring at the time of the input of a finger for fingerprint authentication and fingerprint information corresponding to touch information having similarity above a predetermined level. In other words, the candidate group may be determined based on the touch input occurring for fingerprint authentication. The comparing operation may include at least one among the determination of sameness/similarity of a feature point, the determination of sameness/similarity of position of a feature point, and the determination of sameness/similarity of position relationships between feature points. The feature point may include at least one among a start point, an end point, a center point, a triple point, and a turning point, which are unique to a fingerprint. In other words, the processor 440 may perform fingerprint authentication with respect to the selected candidate group by using the touch information.

In various embodiments of the disclosure, an operation method of an electronic device may include: storing information on a touch input occurring for fingerprint registration through a display which includes a touch sensor and a fingerprint sensor configured to acquire fingerprint data through at least a partial region of a display region; and determining, using the information on the touch input, a candidate group for checking of matching of a fingerprint for fingerprint authentication. The determining of the candidate group may include classifying the fingerprint data acquired for fingerprint registration, based on the information on the touch input. The candidate group may be determined based on the touch input occurring for fingerprint authentication.

As in the embodiment described with reference to FIG. 8, the electronic device 101 may store information on a touch input occurring at the time of fingerprint authentication and may utilize the stored information on the touch input, that is, touch information at the time of authentication. Therefore, the amount of fingerprint data to be compared at the time of fingerprint authentication is reduced, thereby reducing the time required and power consumption. The fingerprint registration operation may include a process as shown in FIG. 9A.

Figure 9A:
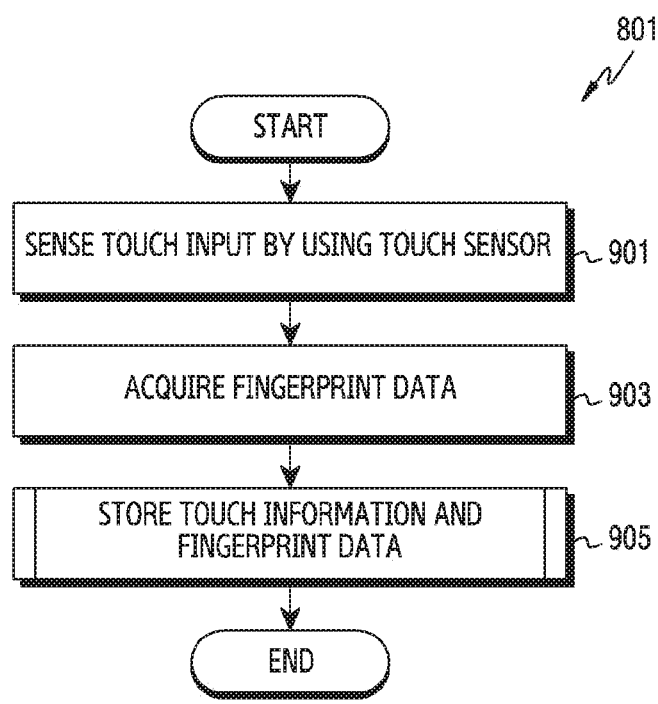
FIG. 9A is a flowchart for registering a fingerprint in an electronic device according to various embodiments of the disclosure.

FIG. 9A is a flowchart for registering a fingerprint in an electronic device according to various embodiments of the disclosure. FIG. 9A illustrates an example of an operation method of the electronic device 101.

Figure 9B:
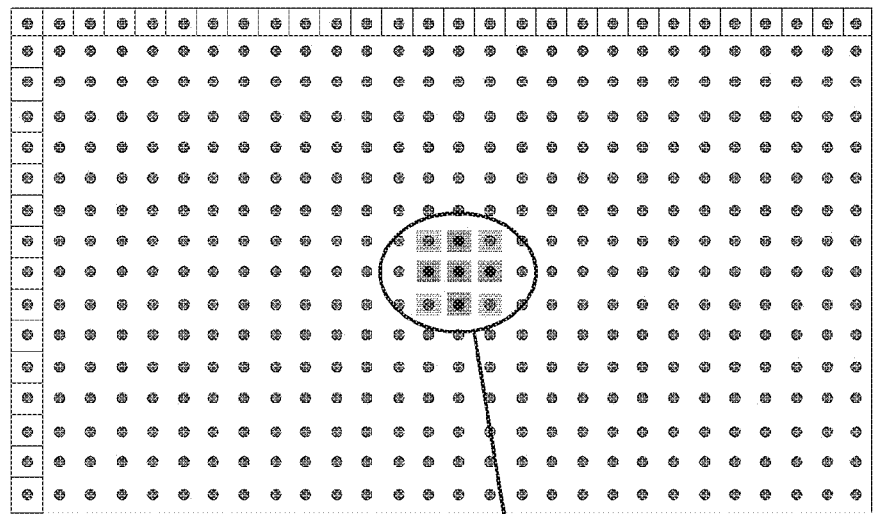
FIG. 9B illustrates a measurement value change depending on a touch input in an electronic device according to various embodiments of the disclosure.
Figure 9B:
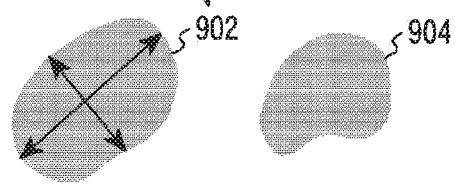
Figure 9B:
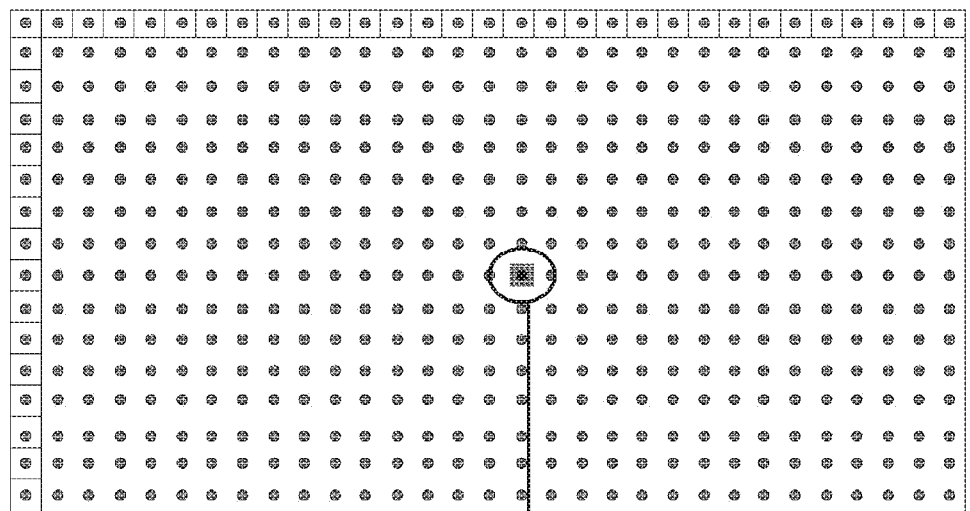
Figure 9B:
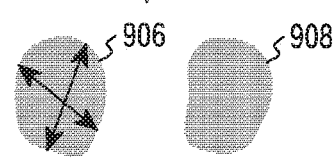

Referring to FIG. 9A, in operation 901, the electronic device 101 (for example, processor 440) may sense a touch input by using a touch sensor. The touch input may be sensed in a region in which a fingerprint sensor is positioned and a region adjacent thereto. That is, the touch input may also occur in a region other than a region in which the fingerprint sensor is positioned. Therefore, the processor 440 may sense a touch input in the region in which a fingerprint sensor is positioned and a region adjacent thereto. The touch input may be sensed by a change in measurement values by the touch sensor included in display 410. For example, the change in measurement values may be made as shown in FIG. 9B. Referring to FIG. 9B, the touch sensor may generate measurement values at multiple measurement points. The touch IC provides the measurement values to the processor 440. When relatively high values are measured at some measurement points, the processor 440 may sense that touch inputs occur in the corresponding positions. According to the degree and range of changes in the measurement values, areas or the like of various touch inputs 902, 904, 906, and 908 may be distinguished.

In operation 903, the electronic device 101 (for example, processor 440) may acquire fingerprint data. The fingerprint sensor 430 included in the electronic device 101 is installed in at least a partial region of the display region of the display 410, and thus may sense a fingerprint when a touch input is generated in a region in which the fingerprint sensor 430 is installed. That is, the processor 440 may acquire fingerprint data by sensing a user's fingerprint through the fingerprint sensor 430. The fingerprint data may include at least one among an image of a fingerprint, information on a feature point, and information on a relationship (for example, distance) between feature points.

In operation 905, the electronic device 101 (for example, processor 440) may store the touch information and the fingerprint data. Because the touch input has occurred at the time of the acquisition of the fingerprint data, there may be touch information corresponding to the fingerprint data. Therefore, the processor 440 may store the fingerprint data and the touch information corresponding thereto. For example, the processor 440 may store the fingerprint data and the touch information in a separate storage space (for example, security memory 422) different from a storage space for normal data.

As in the embodiment described with reference to FIGS. 9A and 9B, the electronic device 101 may store touch information generated at the time of fingerprint sensing together with fingerprint data. In accordance with one embodiment, the touch information stored together with the fingerprint data may be utilized in order to classify the fingerprint data. Hereinafter, a fingerprint data storage process using the touch information will be described with reference to FIG. 10A.

Figure 10A:
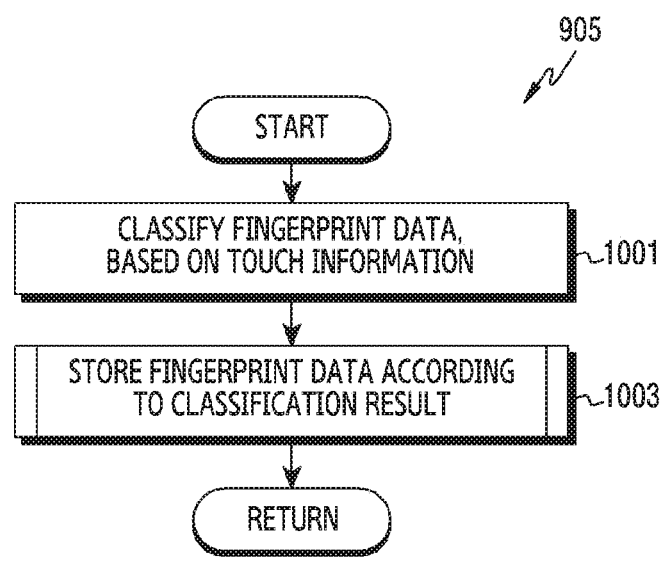
FIG. 10A is a flowchart for storing fingerprint data based on touch information in an electronic device according to various embodiments of the disclosure.

FIG. 10A is a flowchart for storing fingerprint data based on touch information in an electronic device according to various embodiments of the disclosure. FIG. 10A illustrates an example of an operation method of the electronic device 101.

Referring FIG. 10A, in operation 1001, the electronic device 101 (for example, processor 440) may classify fingerprint data based on touch information. Specific criteria for the classification of fingerprint data may be differently defined depending on various embodiments. For example, the fingerprint data may be classified based on at least one or a combination of at least two among an area, a position, a width, a curvature, an orientation, and an angle of a touch input.

In accordance with one embodiment, the fingerprint data may be classified based on an area of a touch input. For example, as in FIG. 10B, the area of the touch input is evaluated according to levels, and the fingerprint data may be classified as group 1 (902) or group 2 (904) according to the level of the area. Because, even in the case of the same finger, the area of a touch input may be varied depending on a touch state, the fingerprint data of the same finger may be classified into different groups. That is, the processor 440 may classify fingerprint data of the same finger into multiple groups In accordance with another embodiment, the fingerprint data may be classified based on at least one among an area, a width (for example, major axis length or minor axis length), and a curvature. For example, when touch inputs occur as in FIG. 10C, touch information may be generated as in <Table 1>, <Table 2>, <Table 3>, and <Table 4>.

TABLE 1

| Item | Value |
|---|---|
| Area | 27-34 mm$^2$ |
| Width | 11.2-11.4 mm |
| Curvature (ratio of major axis to minor axis) | 4.5-4.8 |

Figure 10B:
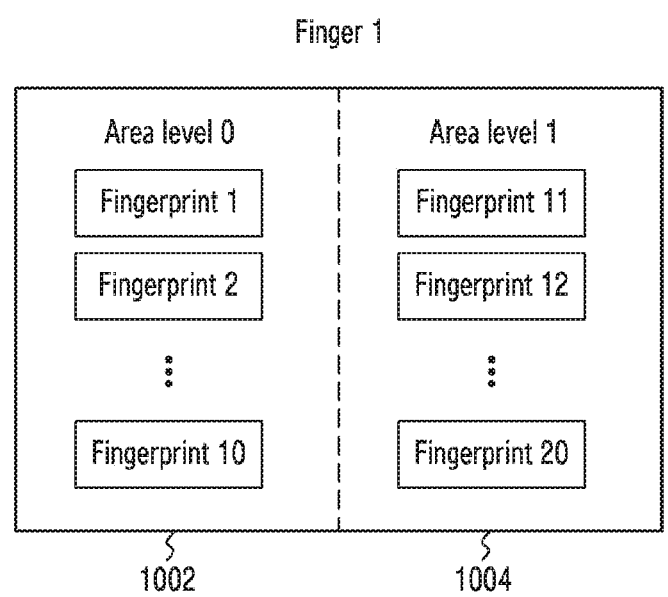
FIG. 10B illustrates an example of fingerprint data classification based on touch information in an electronic device according to various embodiments of the disclosure.
Figure 10C:
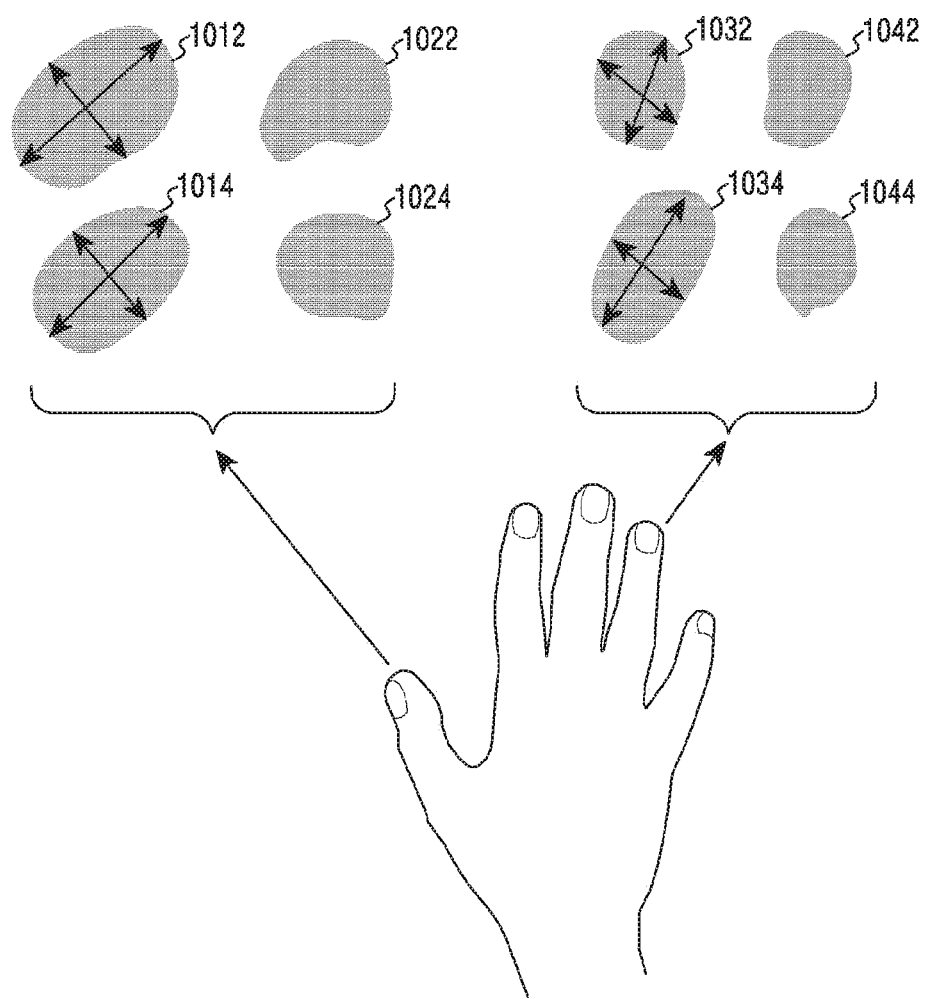
FIG. 10C illustrates another example of fingerprint data classification based on touch information in an electronic device according to various embodiments of the disclosure.

<Table 1> is an example of touch information corresponding to a first touch input 912 or second touch input 914 in FIG. 10B.

TABLE 2

| Item | Value |
|---|---|
| Area | 14-20 mm$^2$ |
| Width | 11.2-11.4 mm |
| Curvature (ratio of major axis to minor axis | 4.5-4.8 |

<Table 2> is an example of touch information corresponding to a third touch input 922 or fourth touch input 924 in FIG. 10B.

TABLE 3

| Item | Value |
|---|---|
| Area | 21-24 mm$^2$ |
| width | 8.9-9.6 mm |
| Curvature (ratio of major axis to minor axis | 3.4-4.0 |

<Table 3> is an example of touch information corresponding to a fifth touch input 932 or sixth touch input 934 in FIG. 10B.

TABLE 4

| Item | Value |
|---|---|
| Area | 12-16 mm$^2$ |
| Width | 8.6-9.0 mm |

TABLE 4-continued

| Item | Value |
| --- | --- |
| Curvature (ratio of major axis to minor axis) | 3.0-3.5 |

<Table 4> is an example of touch information corresponding to a seventh touch input 942 or eighth touch input 944 in FIG. 10B.

Referring to <Table 1> to <Table 4>, the curvature of the third touch input 922, the fourth touch input 924, the seventh touch input 942, and the eighth touch input 944 is smaller than the curvature of the first touch input 912, the second touch input 914, the fifth touch input 932, and the sixth touch input 934. Therefore, the third touch input 922, the fourth touch input 924, the seventh touch input 942, and the eighth touch input 944 may be determined as tip touches using a fingertip, and the first touch input 912, the second touch input 914, the fifth touch input 932, and the sixth touch input 934 may be determined as normal touches using a wide surface of a finger. Among the normal touches, the areas of the first touch input 912 and the second touch input 914 are larger than the areas of the fifth touch input 932 and the sixth touch input 934. Therefore, the fifth touch input 932 and the sixth touch input 934 may be classified as a group of "smallness", and the first touch input 912 and second touch input 914 may be classified as a group of "largeness".

In accordance with another embodiment, the fingerprint data may be classified based on the position of fingerprint data on a finger. Through touch information, the processor 440 may understand a range of a touch input and a relative position relationship of a touch sensor. For example, as in FIG. 10D, a first fingerprint data 952 may be acquired at the upper part of a fingerprint, a second fingerprint data 954 may be acquired at the intermediate part of the fingerprint, and a third fingerprint data 956 may be acquired at the lower part of the fingerprint. Therefore, the location, in which the fingerprint data has been acquired, is divided into at least two (2) locations (for example, upper location, intermediate location, lower location), and the fingerprint data may be classified according to the locations corresponding to the fingerprint data.

In operation 1003, the electronic device 101 (for example, processor 440) may store fingerprint data according to a classification result. The processor 440 stores fingerprint data in the memory 420 and corresponding touch information may be stored as an attribute of the fingerprint data together therewith. The fingerprint data may be stored as fingerprint information and may be stored in a separate memory (for example, security memory 422) different in security level from a normal memory.

Figure 10D:
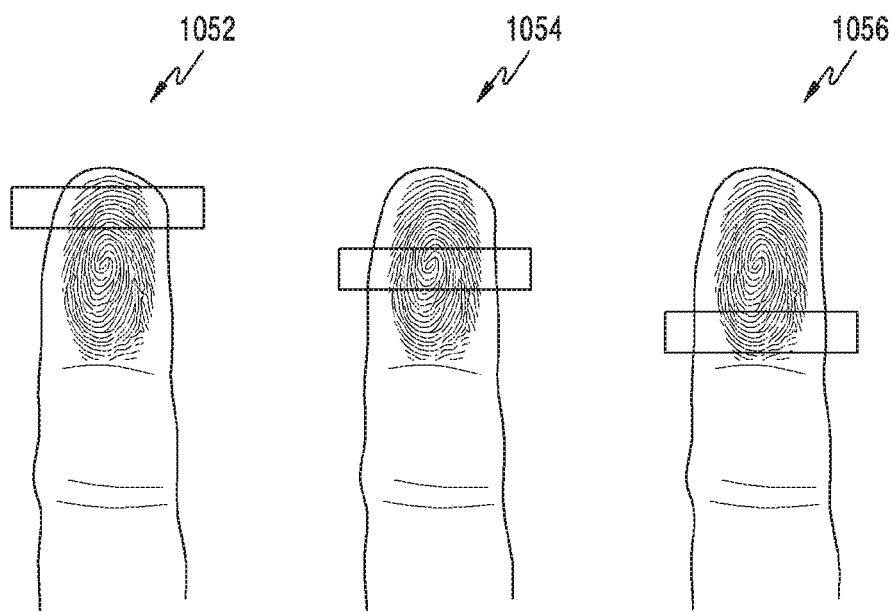
FIG. 10D illustrates another example of fingerprint data classification based on touch information in an electronic device according to various embodiments of the disclosure.

As in the embodiment described in reference to FIGS. 10A and 10D, the fingerprint data may be classified based on touch information. In other words, touch information (for example, area) regarding a specific finger may be stored together based on touch information acquired in a fingerprint registration process. Specifically, the width, curvature, area distribution, etc. of a specific finger may be determined based on touch information, and the electronic device 101 may distinguish the specific finger based on the touch information. When features of fingers are distinct, the touch information may be divided for all of five fingers or may be divided into three steps, such as large, middle, and small sizes.

In addition, compensating for fingerprint data may be further performed by using the touch information.

Figure 11:
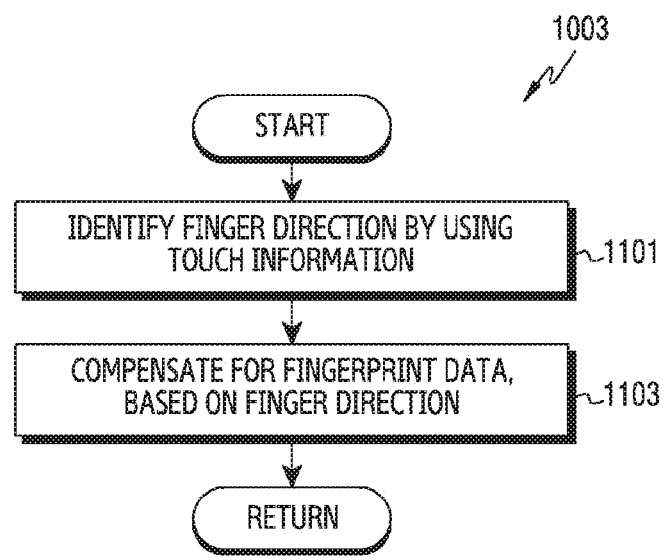
FIG. 11 is a flowchart for compensating for fingerprint data based on touch information in an electronic device according to various embodiments of the disclosure.

FIG. 11 is a flowchart for compensating for fingerprint data based on touch information in an electronic device according to various embodiments of the disclosure. FIG. 11 illustrates an example of an operation method of the electronic device 101.

Referring to FIG. 11, in operation 1101, the electronic device 101 (for example, processor 440) may determine the direction of a finger by using touch information. The direction of the finger may be defined as a relative angle of a major axis or minor axis of a touch input with reference to the fingerprint sensor 430. In other words, the processor 440 determines the major axis or minor axis of the touch input, and may calculate an angle between the minor axis or minor axis and a specific axis of a touch sensor.

In operation 1103, the electronic device 101 (for example, processor 440) may compensate for fingerprint data based on the direction of the finger. In other words, the processor 440 may compensate for fingerprint data by rotating the fingerprint data so as to be aligned with a reference direction. That is, the processor 440 may align the fingerprint data in the reference direction. Therefore, at the time of fingerprint authentication after this, a comparison between fingerprint data aligned in the same direction may be performed.

Figure 12:
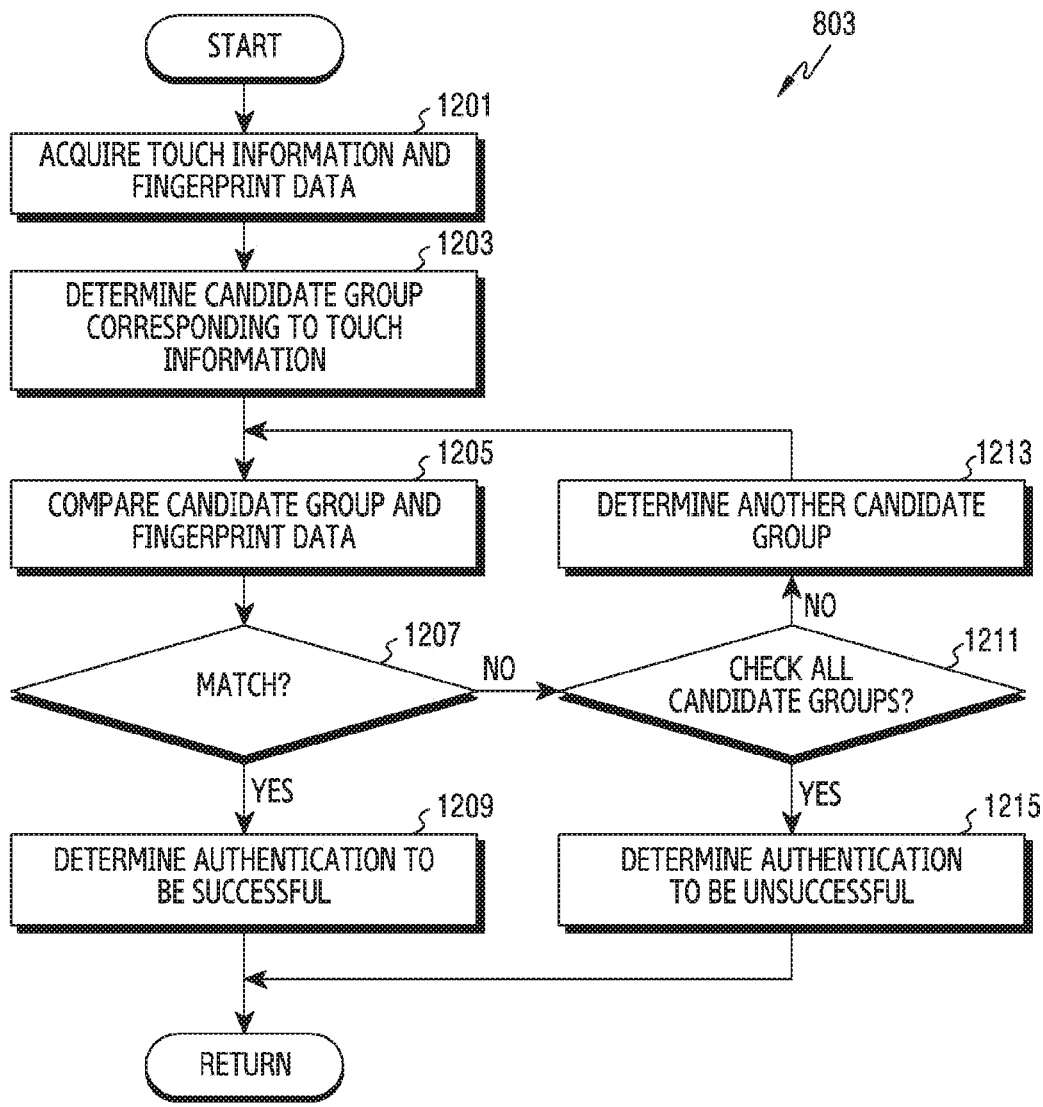
FIG. 12 is a flowchart for performing authentication by using touch information in an electronic device according to various embodiments of the disclosure.

FIG. 12 is a flowchart for performing authentication by using touch information in an electronic device according to various embodiments of the disclosure. FIG. 12 illustrates an example of an operation method of the electronic device 101.

Referring to FIG. 12, in operation 1201, the electronic device 101 (for example, processor 440) may acquire touch information and fingerprint data. In other words, as a touch input occurs in a touch sensor region in order to authenticate a fingerprint, the fingerprint sensor 430 senses the fingerprint, and a touch sensor in the display 410 may generate a measurement value regarding the touch input. The processor 440 may receive fingerprint data and touch information generated by the fingerprint sensor 430 and the touch sensor, respectively. The touch information acquired in operation 1201 may be used to select fingerprint data, that is, a candidate group, for checking from registered information.

In operation 1203, the electronic device 101 (for example, processor 440) may determine a candidate group corresponding to the touch information. Specifically, the processor 440 determines touch information corresponding to each candidate group and may select a candidate group corresponding to touch information most similar to the touch information having been acquired in operation 1201. The similarity of touch information may be determined based on the area, curvature, etc. of a touch input. That is, the processor 440 may select candidate fingerprint information to be checked for fingerprint authentication.

In operation 1205, the electronic device 101 (for example, processor 440) may compare a candidate group with fingerprint data. That is, the processor 440 measures similarity between fingerprint information included in the candidate group and the fingerprint data. In order to measure the similarity, it may be possible to use an algorithm based on a local feature, an algorithm based on a global feature, an algorithm based on the sum of a squared difference, an algorithm based on phase correlation, or an algorithm based on a combination of at least two selected therefrom.

In operation 1207, the electronic device 101 (for example, processor 440) may determine whether a candidate group and fingerprint data match each other. In other words, the electronic device 101 may determine whether there is at least one fingerprint image, which has similarity above a predetermined level to the fingerprint data having been acquired in operation 1201, among fingerprint information included in the candidate group.

If the candidate group and the fingerprint data match each other, the electronic device 101 (for example, processor 440) may determine in operation 1209 that authentication is successful. That is, the processor 440 declares success in authentication and may perform a necessary follow-up operation (for example, secured data processing). For example, when authentication is performed for identifying a user before electronic approval, the processor 440 may perform functions for the electronic approval.

On the other hand, if the candidate group and the fingerprint data do not match each other, the electronic device 101 (for example, processor 440) may determine in operation 1211 that all candidate groups have been checked. That is, the processor 440 may determine that all pieces of registered fingerprint information have been compared with the fingerprint data having been acquired in operation 1201. In other words, the processor 440 may determine whether fingerprint information to be checked remains.

If all the candidate groups have not been checked, the electronic device 101 (for example, processor 440) may determine another candidate group in operation 1213. The another candidate group may be determined based on the similarity of touch information. For example, from among the remaining at least one candidate group other than an already checked candidate group, the processor 440 may select a candidate group corresponding to touch information most similar to the touch information having been acquired in operation 1201.

On the other hand, if all the candidate groups have been checked, the electronic device 101 (for example, processor 440) may determine authentication to be unsuccessful in operation 1215. That is, the processor 440 may declare authentication failure and perform a necessary follow-up operation. For example, the processor 440 may display a screen indicating authentication failure through the display 410. Furthermore, the processor 440 may request authentication by displaying a screen requesting a re-input of a fingerprint.

As in the embodiment described in reference to FIG. 12, when a fingerprint is recognized, the electronic device 101 may acquire touch information regarding a contact region from the touch sensor and determine a candidate group. For example, the electronic device 101 may determine whether a finger corresponds to area level 0 or corresponds to a large size, and determine a candidate group, for which a matching algorithm is first performed, among pre-stored fingerprint information. As a result of performing the matching algorithm for the candidate group, when authentication is not completed, the electronic device 101 may perform a matching algorithm for a next candidate group. Hereinafter, a fingerprint authentication process will be described with reference to FIG. 13.

Figure 13:
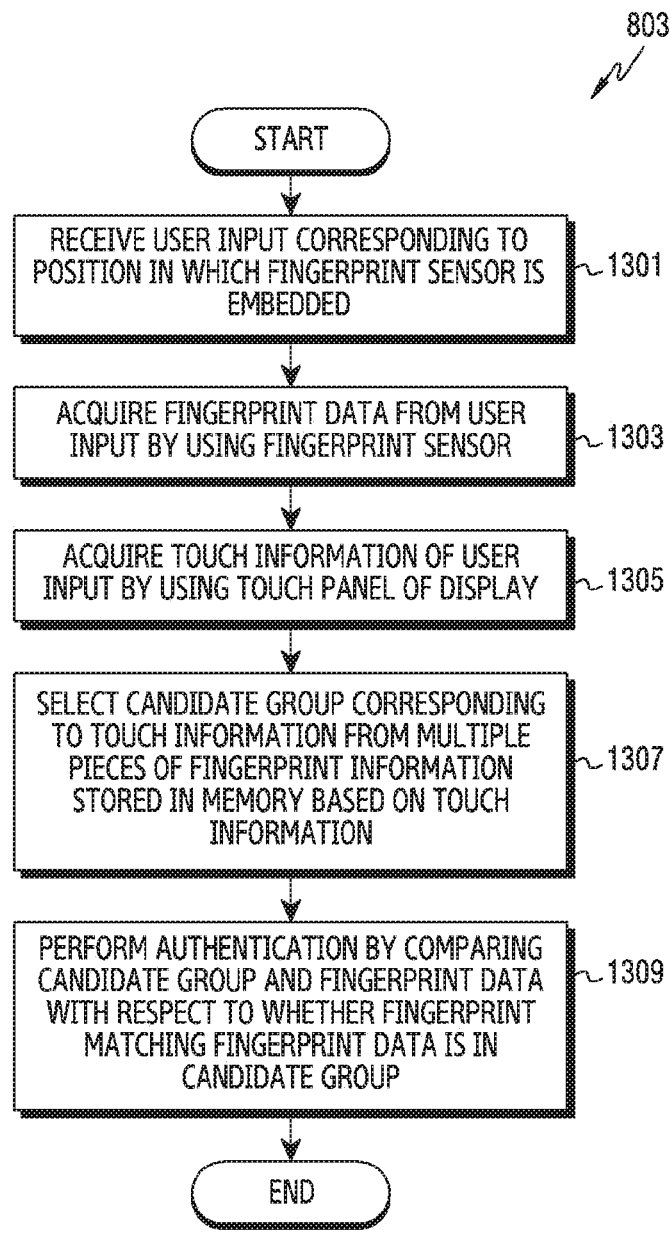
FIG. 13 is another flowchart for performing authentication by using touch information in an electronic device according to various embodiments of the disclosure.

FIG. 13 is another flowchart for performing authentication by using touch information in an electronic device according to various embodiments of the disclosure.

Referring to FIG. 13, in operation 1301, the electronic device 101 (for example, processor 440) may receive a user input regarding a position in which the fingerprint sensor 430 of the display 410 is embedded. Specifically, the processor 440 may display a user interface (UI) for fingerprint authentication on the display 410. The UI requests a fingerprint input for fingerprint authentication and the fingerprint input may be displayed on a part or the entirety of a region in which the fingerprint sensor 430 is positioned. Therefore, a user touches a UI display region on the display 410, in which the touch sensor and the fingerprint sensor 430 are arranged, and the processor 440 can receive the user input.

In operation 1303, the electronic device 101 (for example, processor 440) may acquire fingerprint data from the user input by using the fingerprint sensor 430. In other words, when a user's fingerprint is input according to a UI for fingerprint authentication displayed on the display 410, the fingerprint sensor 430 may generate a measurement value regarding the fingerprint based on the user input and provide the measurement value to the processor 440. The fingerprint data may be acquired by extracting at least one of an image and a feature point of a fingerprint.

In operation 1305, the electronic device 101 (for example, processor 440) may acquire touch information of the user input by using a touch sensor of the display 410. That is, when the user touch input occurs according to the UI for fingerprint authentication displayed on the display 410, the touch sensor may generate a measurement value regarding the touch input and the measurement value to the processor 440. The touch sensor may be installed on the entirety or a partial region of the display 410, and the touch information may include at least one among coordinates, a major axis length, a minor axis length, an area, an angle, a pressure, and a position of the touch input.

In operation 1307, the electronic device 101 (for example, processor 440) may select a candidate group corresponding to the touch information from multiple pieces of fingerprint information stored in the memory 420 based on the touch information. In other words, the processor 440 may determine a candidate group, which has been stored together with touch information most similar to the touch information, from among candidate groups of pre-stored fingerprint information. In one embodiment, the candidate group may be selected based on an area of a finger. Specifically, the selected candidate group may be one of candidate groups classified according to levels (for example, large, middle, small) of an area. In another embodiment, the candidate group may be selected based on a position of a finger. Specifically, the selected candidate group may be one of candidate groups classified according to the upper, intermediate, lower parts of fingerprint. The fingerprint information may refer to fingerprints pre-stored in the memory 420 through fingerprint registration.

In operation 1309, the electronic device 101 (for example, processor 440) may compare a candidate group with fingerprint data and determine whether there is a fingerprint matching the fingerprint data, thereby performing authentication. That is, the processor 440 may determine priorities of candidate groups according to the matching algorithm and compare fingerprint information stored according to the determined candidate groups with the fingerprint data based on the user input. When the fingerprint data and the fingerprint information match each other, the processor 440 may determine that authentication is successful.

Figure 14:
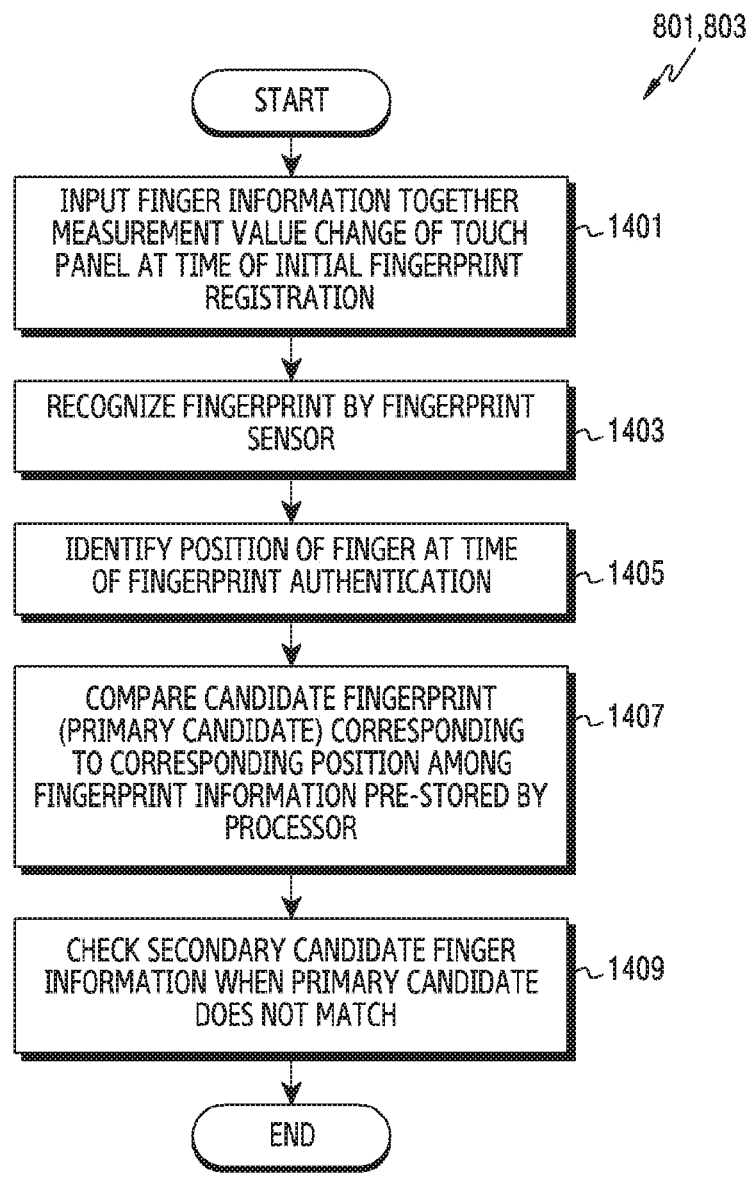
FIG. 14 is another flowchart for registering and authenticating a fingerprint in an electronic device according to various embodiments of the disclosure.

FIG. 14 is another flowchart for registering and authenticating a fingerprint in an electronic device according to various embodiments of the disclosure. FIG. 14 illustrates an example of an operation of the electronic device 101.

Referring to FIG. 14, in operation 1401, the electronic device 101 (for example, processor 440) may input, at the time of initial fingerprint registration, finger information together with a fingerprint based on a measurement value change amount of the touch sensor. For example, the processor 440 may display a UI for fingerprint registration through the display 410. By a user input according to the UI for fingerprint registration, the processor 440 may acquire touch information. Specifically, the touch IC may acquire row data regarding a measurement value change amount according to a touch input, detect a peak equal to or larger than a threshold, calculate a coordinate calculation region near the peak, and calculate coordinates (for example: X-coordinate and Y-coordinate) through the coordinate region. The touch IC may grant an identifier (ID) to the touch input and may report the processor 440 on a coordinate event notifying of the occurrence of the touch input. Subsequently, in fingerprint registration, fingerprint data acquired by the fingerprint sensor 430 and the touch information may be stored in the memory 420 together. After this, from operation 1403, operations for fingerprint authentication may be performed.

In operation 1403, the electronic device 101 (for example, fingerprint sensor 430) may recognize a fingerprint of a user. That is, the fingerprint sensor 430 may acquire fingerprint data of a user input. When a user input occurs according to the UI region for fingerprint authentication, the fingerprint sensor 430 may extract at least one of an image and a feature point of the fingerprint data.

In operation 1405, the electronic device 101 (for example, processor 440) may identify a position of a fingerprint at the time of fingerprint authentication. Specifically, the processor 440 may identify a position of a touch input based on touch input data provided from the touch IC and determine the position of the touch input relative to the fingerprint sensor 430. Therefore, the processor 440 may determine which position of the touch input corresponds to which position of a finger based on touch information.

In operation 1407, the electronic device 101 (for example, processor 440) may perform a comparison from a candidate group of fingerprints, which correspond to the corresponding position, among pre-stored fingerprint information. In other words, the processor 440 may select, as a candidate, fingerprint information of the same position as a fingerprint recognized in operation 1403 among fingerprint information pre-stored in the memory 420, and may determine whether the selected candidate matches the fingerprint recognized in operation 1403, through a comparison therebetween. For example, when a fingerprint acquired through the fingerprint sensor 430 in a touch region acquired from the touch sensor corresponds to the upper part of the entire touch region, the processor 440 may enhance the recognition speed by comparing the fingerprint with fingerprint information corresponding to the upper part during fingerprint registration.

In the case of a mismatch of a primary candidate group, in operation 1409, the electronic device 101 (for example, processor 440) may check fingerprint information of a secondary candidate group. That is, when the fingerprint information of the primary candidate group does not match fingerprint information of a user input, the processor 440 may perform authentication by comparing the fingerprint information of the secondary candidate group with the fingerprint data of the user input. The secondary candidate group may mean a candidate group having fingerprint information most similar to the fingerprint data after the primary candidate group. When the fingerprint information of the candidate group matches the fingerprint data, the processor 440 may determine that authentication is successful.

As in the embodiment described with reference to FIG. 14, a fingerprint may be registered and authenticated. At the time of fingerprint registration and fingerprint authentication, a UI for each process may be displayed. At the time of fingerprint registration, the UI may request an input of a fingerprint of a specific finger. In this case, the electronic device 101 may determine an input fingerprint as a fingerprint of the requested finger. Therefore, at the time of authentication, when fingerprint data corresponding to the same touch information are acquired, an indication signal (for example, flag) for the corresponding finger may be transmitted to the processor 440 in the electronic device 101, for example, in a touch IC.

In accordance with the various embodiments described above, fingerprint registration and authentication using touch information may be performed. In various embodiments, the touch information may provide information on a finger. In accordance with another embodiment, information on a hand holding the electronic device 101 during a fingerprint input may be utilized. That is, the electronic device 101 may determine which hand holds the electronic device 101 during a fingerprint input and may store whether the input occurs by a left hand or whether the input occurs by a right hand together. The holding hand may be identified based on at least one selected from among an orientation of a finger touch input and positions in which touch inputs other than the finger touch input are distributed. As a specific example, when a touch input other than the finger touch input is sensed at a right boundary of the display 410, the electronic device 101 may estimate that the electronic device 101 is held by a right hand. When a touch input is oriented to be inclined to the left, the electronic device 101 may estimate that the electronic device 101 is held by a right hand.

In accordance with the various embodiments described above, the electronic device 101 may classify fingerprint data by using touch information at the time of fingerprint registration. Additionally, in accordance with another embodiment, the electronic device 101 may collect fingerprint data through normal applications other than an application for fingerprint registration and may store touch information together with the fingerprint data. In other words, even in the collection of fingerprint data in addition to in a fingerprint registration or authentication process, the electronic device 101 may acquire and store touch information. For example, when a touch input occurs in a fingerprint sensor region during execution of a normal application, the electronic device 101 may collect fingerprint data and may classify and store the collected fingerprint data based on touch information.

A term "module" used in the present disclosure includes a unit consisting of hardware, software, or firmware, and may be interchangeably used with the terms "a unit", "a logic", "a logical block", "a component", "a circuit", etc. The term "module" may be an integrally constructed component or a minimum unit or one part thereof for performing one or more functions. The "module" may be mechanically or electrically implemented, and may include an application specific integrated circuit (ASIC) chip, field programmable gate arrays (FPGAs), or a programmable-logic device, which is known or is to be developed to perform certain operations. At least one part of an apparatus (e.g., modules or functions thereof) or method (e.g., operations) according to various embodiments of the present disclosure may be implemented with an instruction stored in a non-transitory computer-readable storage media. If the instruction is executed by one or more processors, the one or more processors may perform a function corresponding to the instruction. The computer-readable storage media may include a hard disk, a floppy disk, magnetic media (e.g., a magnetic tape), optical media (e.g., a compact disc-ROM (CD-ROM), a DVD, magnetic-optic media (e.g., a floptical disk)), an internal memory, etc. The instruction may include a code created by a compiler or a code executable by an interpreter. A module or program module according to various embodiments of the present disclosure may further include one or more of the aforementioned elements, or omit some, or further include another element. Operations carried out by a module, a program module, or another element according to various embodiments may be executed in a sequential, parallel, repeated, or heuristic manner, or at least some operations may be executed in different sequences or may be omitted, or another operation may be added.

Therefore, in accordance with one embodiment, the non-transitory computer readable medium may include multiple instructions. When the multiple instructions are executed by the processor, the processor may be configured to perform: displaying an object for a first application in a partial region in which a fingerprint sensor is installed to acquire fingerprint data through at least a partial region of the display region of a display; acquiring fingerprint data including at least one fingerprint image in response to a touch input to the object; and registering, as fingerprint information, the fingerprint data and a reference fingerprint image acquired through a second application. Furthermore, by the multiple instructions, the processor may be configured to further perform activating a fingerprint sensor in response to a generated touch input.

In the above-described specific embodiments of the disclosure, an element included in the disclosure has been expressed in the singular form or the plural form according to the presented specific embodiments. However, the singular form or plural form is selected for convenience of description suitable for the presented situation, and various embodiments of the disclosure are not limited to a single element or multiple elements thereof. Further, multiple elements expressed in the description may be configured into a single element or a single element in the description may be configured into multiple elements.

Meanwhile, although the concrete embodiments of the disclosure have been described in the detailed description of the disclosure, various modifications can be made without departing from the scope of the disclosure. Therefore, the scope of the disclosure should not be limited to the aforementioned embodiments, but should be defined by equivalents to the appended claims as well as the claims.

The invention claimed is:

1. An electronic device comprising:
a memory;
a display comprising a touch sensor;
a fingerprint sensor configured to acquire fingerprint data through at least a partial region of a display region of the display; and
a processor,
wherein the processor is configured to:
in response to a first user input for registering a user's fingerprint, acquire first touch information from the first user input by using the touch sensor and acquire first fingerprint data by using the fingerprint sensor;
register the first fingerprint data as fingerprint information based on the first touch information, the registering comprising storing the first touch information and the first fingerprint data together in the memory, and the registering further comprising classifying the first fingerprint data based on the first touch information;
in response to a second user input for authenticating the user's fingerprint, acquire second touch information from the second user input by using the touch sensor and acquire second fingerprint data by using the fingerprint sensor;
select a candidate group for comparison with the second fingerprint data from among the fingerprint information based on comparison between the second touch information and the first touch information; and
compare fingerprint data included in the candidate group with the second fingerprint data.

2. The electronic device of claim 1, wherein the processor is configured to:
identify a hand holding the electronic device at the time of generation of the first fingerprint data by using the first touch information, and
classify the first fingerprint data, based on the hand.

3. The electronic device of claim 1, wherein the processor is configured to distinguish a normal touch and a tip touch, based on a curvature included in the first touch information.

4. The electronic device of claim 1, wherein the processor is configured to classify fingerprint data regarding a same finger into multiple groups, based on an area included in the first touch information.

5. The electronic device of claim 1, wherein the processor is configured to:
determine another candidate group when there is no fingerprint data matching the second fingerprint data in the candidate group.

6. The electronic device of claim 1, wherein the processor is configured to acquire the second user input for performing authentication of the user through the at least partial region of the display region.

7. The electronic device of claim 1, wherein the first touch information comprises at least one among an area, a major axis length, a minor axis length, an orientation, an angle, a curvature, a pressure, and a position of the first user input.

8. The electronic device of claim 1, wherein the processor is configured to store the first fingerprint data and the first touch information together in the memory having a security level different from that of a normal memory.

9. The electronic device of claim 1, wherein the processor is configured to acquire at least one of the first touch information and the second touch information through a first region, in which the fingerprint sensor is disposed, and a second region near the first region.

10. The electronic device of claim 1, wherein the display includes a region through which light can pass, and
wherein the processor is configured to acquire at least one of the first fingerprint data and the second fingerprint data through the region through which light can pass.

11. The electronic device of claim 1, wherein the processor is configured to store first touch information as attribute information of the first fingerprint data.

12. The electronic device of claim 1, wherein the processor is configured to compare at least one among an area, a position, a width, a curvature, an orientation, and an angle included in the first touch information with the second touch information.

* * * * *